United States Patent
Bossen et al.

(10) Patent No.: US 11,689,722 B2
(45) Date of Patent: Jun. 27, 2023

(54) SYSTEMS AND METHODS FOR DERIVING QUANTIZATION PARAMETERS FOR VIDEO BLOCKS IN VIDEO CODING

(71) Applicants: Sharp Kabushiki Kaisha, Sakai (JP); FG Innovation Company Limited, Tuen Mun (HK)

(72) Inventors: Frank Bossen, Sakai (JP); Kiran Mukesh Misra, Sakai (JP); Christopher Andrew Segall, Sakai (JP); Jie Zhao, Sakai (JP); Weijia Zhu, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 17/044,253

(22) PCT Filed: Apr. 1, 2019

(86) PCT No.: PCT/JP2019/014543
§ 371 (c)(1),
(2) Date: Sep. 30, 2020

(87) PCT Pub. No.: WO2019/194147
PCT Pub. Date: Oct. 10, 2019

(65) Prior Publication Data
US 2021/0152830 A1    May 20, 2021

Related U.S. Application Data

(60) Provisional application No. 62/651,457, filed on Apr. 2, 2018.

(51) Int. Cl.
*H04N 19/124*    (2014.01)
*H04N 19/119*    (2014.01)
(Continued)

(52) U.S. Cl.
CPC ......... *H04N 19/124* (2014.11); *H04N 19/119* (2014.11); *H04N 19/172* (2014.11);
(Continued)

(58) Field of Classification Search
CPC .... H04N 19/176; H04N 19/119; H04N 19/96; H04N 19/124; H04N 19/186; H04N 19/172
See application file for complete search history.

(56) References Cited

U.S. PATENT DOCUMENTS

| | | | |
|---|---|---|---|
| 2009/0296808 A1 | 12/2009 | Regunathan et al. | |
| 2014/0079135 A1 | 3/2014 | Auwera et al. | |

(Continued)

FOREIGN PATENT DOCUMENTS

| | | |
|---|---|---|
| CN | 103155553 A | 6/2013 |
| CN | 103428497 A | 12/2013 |

(Continued)

OTHER PUBLICATIONS

An, Jicheng, et al., "Quadtree plus binary tree structure integration with JEM tools", JVET-B0023, JVET of ITU-T SG 16 WP 3 and ISO/IEC JTC 1/SC 29/WG 11, 2nd Meeting, Feb. 20-26, 2016, 11 pages, San Diego, CA, USA.

(Continued)

*Primary Examiner* — Robert J Hance
(74) *Attorney, Agent, or Firm* — ScienBiziP, P.C.

(57) ABSTRACT

Some embodiments provide a method of decoding a current video block in a video picture. From several partitioning schemes, the method identifies a partitioning scheme that is used to partition the current video block. Based on the identified partitioning scheme, the method selects one derivation to compute a first quantization parameter for the current video block from several candidate derivations for computing the first quantization parameter. The method (Continued)

computes a second quantization parameter for the current video block based at least in part on the computed first quantization parameter. The method then uses the computed second quantization parameter to decode the current video block.

11 Claims, 19 Drawing Sheets

(51) Int. Cl.
  *H04N 19/172*   (2014.01)
  *H04N 19/176*   (2014.01)
  *H04N 19/186*   (2014.01)
  *H04N 19/96*   (2014.01)

(52) U.S. Cl.
  CPC ......... *H04N 19/176* (2014.11); *H04N 19/186* (2014.11); *H04N 19/96* (2014.11)

(56) References Cited

U.S. PATENT DOCUMENTS

| | | |
|---|---|---|
| 2014/0104492 A1 | 4/2014 | Liu et al. |
| 2014/0286402 A1 | 9/2014 | Nishitani et al. |
| 2014/0286403 A1 | 9/2014 | Nishitani et al. |
| 2015/0063460 A1 | 3/2015 | Gamei et al. |
| 2015/0071344 A1 | 3/2015 | Tourapis et al. |
| 2015/0071345 A1* | 3/2015 | Tourapis .............. H04N 19/186 375/240.03 |
| 2015/0365671 A1 | 12/2015 | Pu et al. |
| 2015/0373327 A1 | 12/2015 | Zhang et al. |
| 2017/0208336 A1 | 7/2017 | Li et al. |
| 2017/0272759 A1 | 9/2017 | Seregin et al. |
| 2018/0020241 A1* | 1/2018 | Li .......................... H04N 19/18 |
| 2018/0309992 A1 | 10/2018 | Lim et al. |
| 2019/0124366 A1 | 4/2019 | Zhao et al. |
| 2019/0124367 A1 | 4/2019 | Lu et al. |
| 2020/0204799 A1* | 6/2020 | Lee ....................... H04N 19/159 |
| 2020/0322602 A1* | 10/2020 | Huang ................... H04N 19/70 |

FOREIGN PATENT DOCUMENTS

| | | | |
|---|---|---|---|
| CN | 103975589 A | 8/2014 | |
| CN | 104427339 A | 3/2015 | |
| CN | 104737538 A | 6/2015 | |
| WO | 2009158113 A2 | 12/2009 | |
| WO | 2011156458 A1 | 12/2011 | |
| WO | 2015035092 A2 | 3/2015 | |
| WO | 2017206826 A1 | 12/2017 | |
| WO | WO-2017206826 A1 * | 12/2017 | ........... H04N 19/119 |
| WO | 2018016381 A1 | 1/2018 | |
| WO | WO-2019121164 A1 * | 6/2019 | |
| WO | 2019194147 A1 | 10/2019 | |

OTHER PUBLICATIONS

Author Unknown, "Series H: Audiovisual and Multimedia Systems, Infrastructure of audiovisual services—Coding of moving video, High efficiency video coding," Recommendation ITU-T H.265, Dec. 2016, 664 pages, ITU Telecommunication Standardization Sector of ITU, Geneva, Switzerland.

Author Unknown, "Series H: Audiovisual and Multimedia Systems, Infrastructure of audiovisual services—Coding of moving video, High efficiency video coding," Recommendation ITU-T H.265, Apr. 2013, 317 pages, ITU Telecommunication Standardization Sector of ITU, Geneva, Switzerland.

Author Unknown, "Series H: Audiovisual and Multimedia Systems, Infrastructure of audiovisual services—Coding of moving video, High efficiency video coding," Recommendation ITU-T H.265, Apr. 2015, 634 pages, ITU Telecommunication Standardization Sector of ITU, Geneva, Switzerland.

Bross, Benjamin, et al., "High Efficiency Video Coding (HEVC) text specification draft 9," JCTVC_K1005_v1, Joint Collaborative Team on Video Coding (JCT-VC) of ITU-T SG16 WP3 and ISO/IEC JTC1/SC29/WG11, 11th Meeting, Oct. 10-19, 2012, 318 pages, Shanghai, CN.

Chen, Jianle, et al., "Algorithm Description of Joint Exploration Test Model 2," JVET-B1001_v1, JVET of ITU-T SG 16 WP 3 and ISO/IEC JTC 1/SC 29/WG 11, 2nd Meeting, Feb. 20-26, 2016, 41 pages, San Diego, USA.

Chen, Jianle, et al., "Algorithm Description of Joint Exploration Test Model 2," JVET-B1001_v3, JVET of ITU-T SG 16 WP 3 and ISO/IEC JTC 1/SC 29/WG 11, 2nd Meeting, Feb. 20-26, 2016, 32 pages, San Diego, USA.

Chen, Jianle, et al., "Algorithm Description of Joint Exploration Test Model 7 (JEM 7)," JVET-G1001-v1, JVET of ITU-T SG 16 WP 3 and ISO/IEC JTC 1/SC 29/WG 11, 7th Meeting, Jul. 13-21, 2017, 50 pages, Torino, IT.

Misra, Kiran Mukesh, et al., (U.S. Appl. No. 62/598,956), filed Dec. 14, 2017, 91 pages.

PCT International Search Report and Written Opinion of Commonly Owned International Patent Application PCT/JP2019/014543, dated Jun. 11, 2019, 7 pages, International Searching Authority (JPO).

Ribas-Corbera Jordi, et al., "Rate Control for Low-Delay Video Communications," ITU—Telecommunications Standardization Sector, Study Group 16, Q15-A-20, Jun. 24-27, 1997, 27 pages, Portland, USA.

Sze, Vivienne, et al., "High Efficiency Video Coding (HEVC): Algorithms and Architectures," Integrated Circuits and Systems, 2014, 384 pages, Springer International Publishing, Switzerland.

Extended European Search Report of Commonly Owned corresponding European Patent Application EP19781731.5, dated Dec. 16, 2021, 11 pages, European Patent Office.

Author Unknown, "Series H: Audiovisual and Multimedia Systems, Infrastructure of audiovisual services—Coding of moving video, High efficiency video coding," Recommendation ITU-T H.264, Apr. 2017, 812 pages, ITU Telecommunication Standardization Sector of ITU, Geneva, Switzerland.

Author Unknown, "Information technology—Coding of audio-visual objects—Part 2: Visual," International Standard, ISO/IEC 14496-2, Second edition, Dec. 1, 2001, 536 pages, ISO/IEC, Geneva, Switzerland.

* cited by examiner

SYSTEMS AND METHODS FOR DERIVING QUANTIZATION PARAMETERS FOR VIDEO BLOCKS IN VIDEO CODING

CLAIM OF BENEFIT TO PRIOR APPLICATIONS

This application is a national stage application of International Patent Application PCT/JP2019/014543, filed Apr. 1, 2019, now published as WO/2019194147. International Patent Application PCT/JP2019/014543 claims the benefit of U.S. Provisional Patent Application 62/651,457, filed Apr. 2, 2018. U.S. Provisional Patent Application 62/651,457 and International Patent Application PCT/JP2019/014543, now published as WO/2019194147, are incorporated herein by reference.

TECHNICAL FIELD

This disclosure relates to video coding and more particularly to techniques for deriving quantization parameters.

BACKGROUND ART

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards may incorporate video compression techniques. Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265, December 2016, which is incorporated by reference, and referred to herein as ITU-T H.265, Extensions and improvements for ITU-T H.265 are currently being considered for the development of next generation video coding standards. For example, the ITU-T Video Coding Experts Group (VCEG) and ISO/IEC (Moving Picture Experts Group (MPEG) (collectively referred to as the Joint Video Exploration Team (JVET)) are studying the potential need for standardization of future video coding technology with a compression capability that significantly exceeds that of the current HEVC standard. The Joint Exploration Model 7 (JEM 7), Algorithm Description of Joint Exploration Test Model 7 (JEM 7), ISO/IEC JTC1/SC29/WG11 Document: JVET-G1001, July 2017, Torino, IT, which is incorporated by reference herein, describes the coding features that are under coordinated test model study by the JVET as potentially enhancing video coding technology beyond the capabilities of ITU-T H.265. It should be noted that the coding features of JEM 7 are implemented in JEM reference software. As used herein, the term JEM may collectively refer to algorithms included in JEM 7 and implementations of JEM reference software.

Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (i.e., groups of frames within a video sequence, a frame within a group of frames, slices within a frame, coding tree units (e.g., macroblocks) within a slice, coding blocks within a coding tree unit, etc.). Intra prediction coding techniques (e.g., intra-picture (spatial)) and inter prediction techniques (i.e., inter-picture (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, motion vectors, and block vectors). Residual data and syntax elements may be entropy coded. Entropy encoded residual data and syntax elements may be included in a compliant bitstream.

SUMMARY OF INVENTION

In one example, a method of coding of video data comprises determining a predictive quantization parameter for a current video block based at least in part on a quantization parameter associated with a reference video block, a partitioning used to generate the reference video block, and a partitioning used to generate the current video block, and generating a quantization parameter for the current video block based at least in part on the determined predictive quantization parameter.

DESCRIPTION OF EMBODIMENTS

Figure 1:
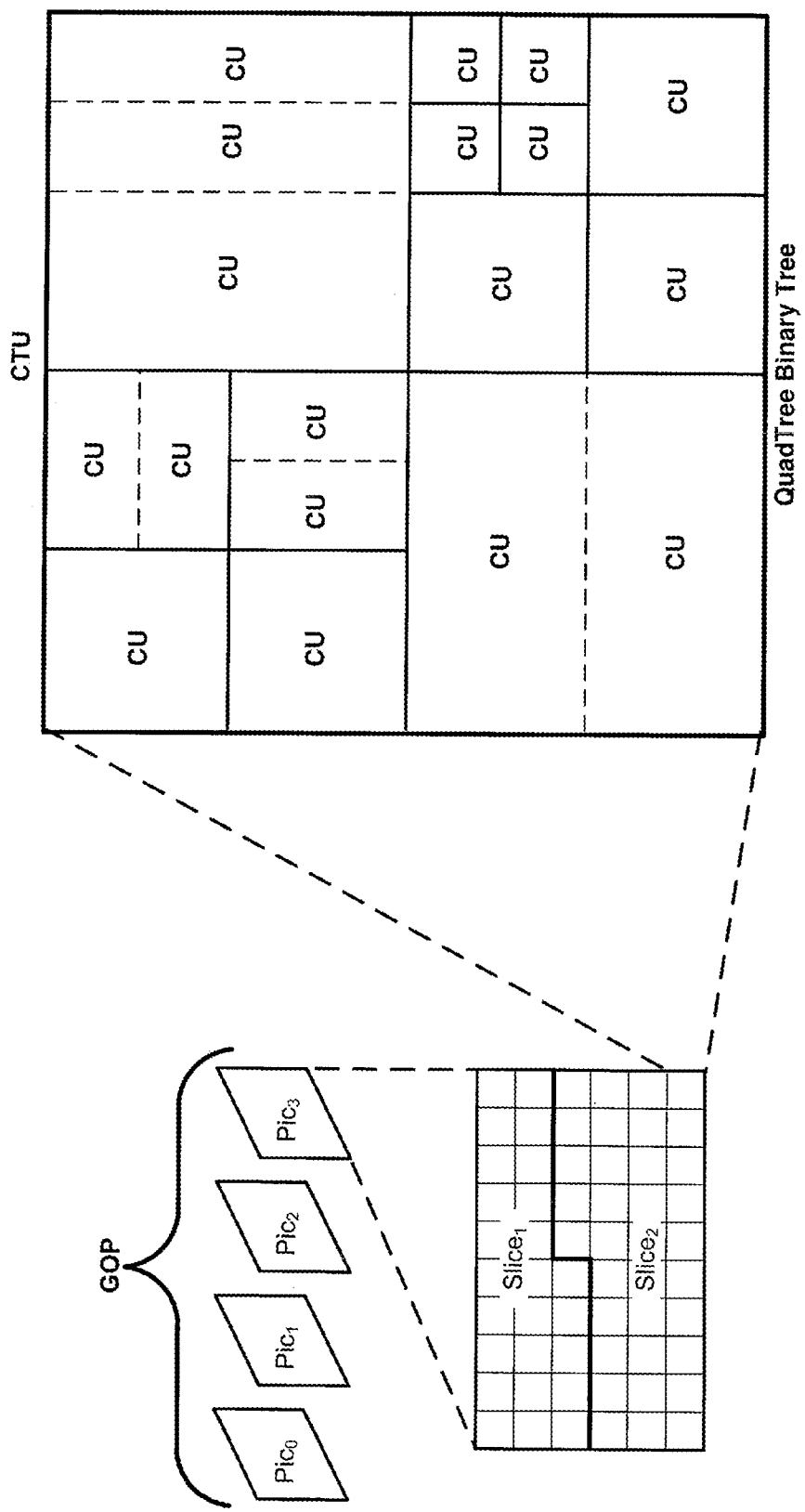
FIG. 1 is a conceptual diagram illustrating an example of a group of pictures coded according to a quad tree binary tree partitioning in accordance with one or more techniques of this disclosure.

In general, this disclosure describes various techniques for coding video data. In particular, this disclosure describes techniques for deriving quantization parameters. It should be noted that although techniques of this disclosure are described with respect to ITU-T H.264. ITU-T H.265, and JEM, the techniques of this disclosure are generally applicable to video coding. For example, the coding techniques described herein may be incorporated into video coding systems. (including video coding systems based on future video coding standards) including block structures, intra prediction techniques, inter prediction techniques, transform techniques, filtering techniques, and/or entropy coding techniques other than those included in ITU-T H.265 and JEM. Thus, reference to ITU-T H.264, ITU-T H.265, and/or JEM is for descriptive purposes and should not be construed to limit the scope of the techniques described herein. Further, it should be noted that incorporation by reference of documents herein is for descriptive purposes and should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a device for coding video data comprises one or more processors configured to determine a predictive quantization parameter for a current video block based at least in part on a quantization parameter associated with a reference video block, a partitioning used to generate the reference video block, and a partitioning used to generate the current video block, and generate a quantization parameter for the current video block based at least in part on the determined predictive quantization parameter.

In one example, a non-transitory computer-readable storage medium comprises instructions stored thereon that, when executed, cause one or more processors of a device to determine a predictive quantization parameter for a current video block based at least in part on a quantization parameter associated with a reference video block, a partitioning used to generate the reference video block, and a partitioning used to generate the current video block, and generate a quantization parameter for the current video block based at least in part on the determined predictive quantization parameter.

In one example, an apparatus comprises means for determining a predictive quantization parameter for a current video block based at least in part on a quantization parameter associated with a reference video block, a partitioning used to generate the reference video block, and a partitioning used to generate the current video block, and means for generating a quantization parameter for the current video block based at least in part on the determined predictive quantization parameter.

The details of one or more examples are set forth in the accompanying drawings and the description below. Other features, objects, and advantages will be apparent from the description and drawings, and from the claims.

Video content typically includes video sequences comprised of a series of frames (or pictures). A series of frames may also be referred to as a group of pictures (GOP). Each video frame or picture may include a plurality of slices or tiles, where a slice or tile includes a plurality of video blocks. As used herein, the term video block may generally refer to an area of a picture or may more specifically refer to the largest array of sample values that may be predictively coded, sub-divisions thereof, and/or corresponding structures. Further, the term current video block may refer to an area of a picture being encoded or decoded. A video block may be defined as an array of sample values that may be predictively coded. It should be noted that in some cases pixel values may be described as including sample values for respective components of video data, which may also be referred to as color components, (e.g., luma (Y) and chroma (Cb and Cr) components or red, green, and blue components). It should be noted that in some cases, the terms pixel value and sample value are used inter-changeably. Video blocks may be ordered within a picture according to a scan pattern (e.g., a raster scan). A video encoder may perform predictive encoding on video blocks and sub-divisions thereof. Video blocks and sub-divisions thereof may be referred to as nodes.

ITU-T H.264 specifies a macroblock including 16×16 luma samples. That is, in ITU-T H.264, a picture is segmented into macroblocks. ITU-T H.265 specifies an analogous Coding Tree Unit (CTU) structure (which may be referred to as a largest coding unit (LCU)). In ITU-T H.265, pictures are segmented into CTUs. In ITU-T H.265, for a picture, a CTU size may be set as including 16×16, 32×32, or 64×64 luma samples. In ITU-T H.265, a CTU is composed of respective Coding Tree Blocks (CTB) for each component of video data (e.g., luma (Y) and chroma (Ch and Cr). It should be noted that video having one luma component and the two corresponding chroma components may be described as having two channels, i.e., a luma channel and a chroma channel. Further, in ITU-T H.265, a CTU may be partitioned according to a quadtree (QT) partitioning structure, which results in the CTBs of the CTU being partitioned into Coding Blocks (CB). That is, in ITU-T H.265, a CTU may be partitioned into quadtree leaf nodes. According to ITU-T H.265, one luma CB together with two corresponding chroma CBs and associated syntax elements are referred to as a coding unit (CU). In ITU-T H.265, a minimum allowed size of a CB may be signaled. In ITU-T H.265, the smallest minimum allowed size of a luma CB is 8×8 luma samples. In ITU-T H.265, the decision to code a picture area using intra prediction or inter prediction is made at the CU level.

In ITU-T H.265, a CU is associated with a prediction unit (PU) structure having its root at the CU. In ITU-T H.265, PU structures allow luma and chroma CBs to be split for purposes of generating corresponding reference samples. That is, in ITU-T H.265, luma and chroma CBs may be split into respective luma and chroma prediction blocks (PBs), where a PB includes a block of sample values for which the same prediction is applied. In ITU-T H.265, a CB may be partitioned into 1, 2, or 4 PBs. ITU-T H.265 supports PB sizes from 64×64 samples down to 4×4 samples. In ITU-T H.265, square PBs are supported for intra prediction, where a CB may form the PB or the CB may be split into four square PBs (i.e., intra prediction PB types include M×M or M/2×M/2, where M is the height and width of the square CB). In ITU-T H.265, in addition to the square PBs, rectangular PBs are supported for inter prediction, where a CB may by halved vertically or horizontally to form PBs (i.e., inter prediction PB types include M×M, M/2×M/2, M/2×M, or M×M/2). Further, it should be noted that in ITU-T H.265, for inter prediction, four asymmetric PB partitions are supported, where the CB is partitioned into two PBs at one quarter of the height (at the top or the bottom) or width (at the left or the right) of the CB (i.e., asymmetric partitions include M/4×M left, M/4×M right, M×M/4 top, and M×M/4 bottom). Intra prediction data (e.g., intra prediction mode syntax elements) or inter prediction data (e.g., motion data syntax elements) corresponding to a PB is used to produce reference and/or predicted sample values for the PB.

Figure 2:
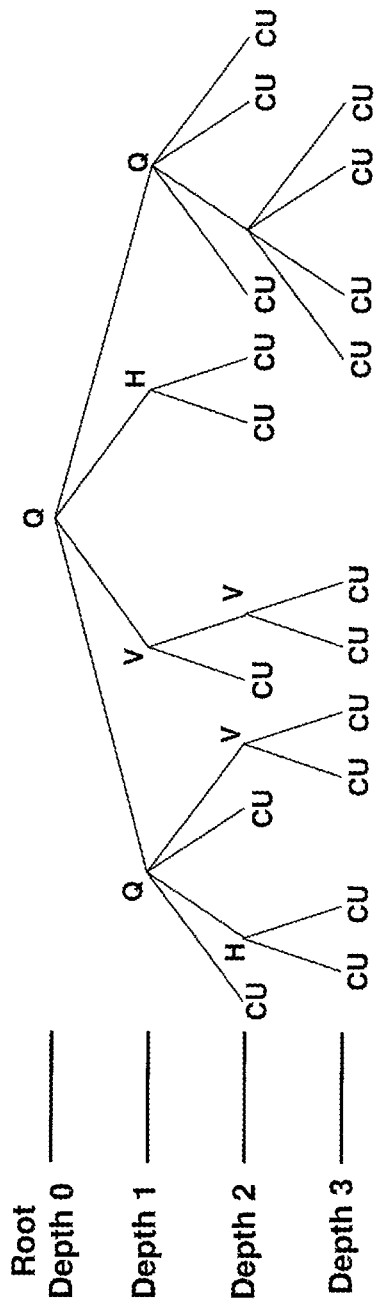
FIG. 2 is a conceptual diagram illustrating an example of a quad tree binary tree in accordance with one or more techniques of this disclosure.

JEM specifies a CTU having a maximum size of 256×256 luma samples. JEM specifies a quadtree plus binary tree (QTBT) block structure. In JEM, the QTBT structure enables quadtree leaf nodes to be further partitioned by a binary tree (BT) structure. That is, in JEM, the binary tree structure enables quadtree leaf nodes to be recursively divided vertically or horizontally. FIG. 1 illustrates an example of a CTU (e.g., a CTU having a size of 256×256 luma samples) being partitioned into quadtree leaf nodes and quadtree leaf nodes being further partitioned according to a binary tree. That is, in FIG. 1 dashed lines indicate additional binary tree partitions in a quadtree. Thus, the binary tree structure in JEM enables square and rectangular leaf nodes, where each leaf node includes a CB. As illustrated in FIG. 1, a picture included in a GOP may include slices, where each slice includes a sequence of CTUs and each CTU may be partitioned according to a QTBT structure. FIG. 1 illustrates an example of QTBT partitioning for one CTU included in a slice. FIG. 2 is a conceptual diagram illustrating an example of a QTBT corresponding to the example QTBT partition illustrated in FIG. 1.

In JEM, a QTBT is signaled by signaling QT split flag and BT split mode syntax elements. When a QT split flag has a value of 1, a QT split is indicated. When a QT split flag has a value of 0, a BT split mode syntax element is signaled. When a BT split mode syntax element has a value of 0 (i.e., BT split mode coding tree=0), no binary splitting is indicated. When a BT split mode syntax element has a value of 3 (i.e., BT split mode coding tree=11), a vertical split mode is indicated. When a BT split mode syntax element has a value of 2 (i.e., BT split mode coding tree=10), a horizontal split mode is indicated. Further, BT splitting may be performed until a maximum BT depth is reached. Thus, according to JEM, the QTBT illustrated in FIG. 2 may be signaled based on the pseudo-syntax provided in Table 1:

TABLE 1

Figure 3:
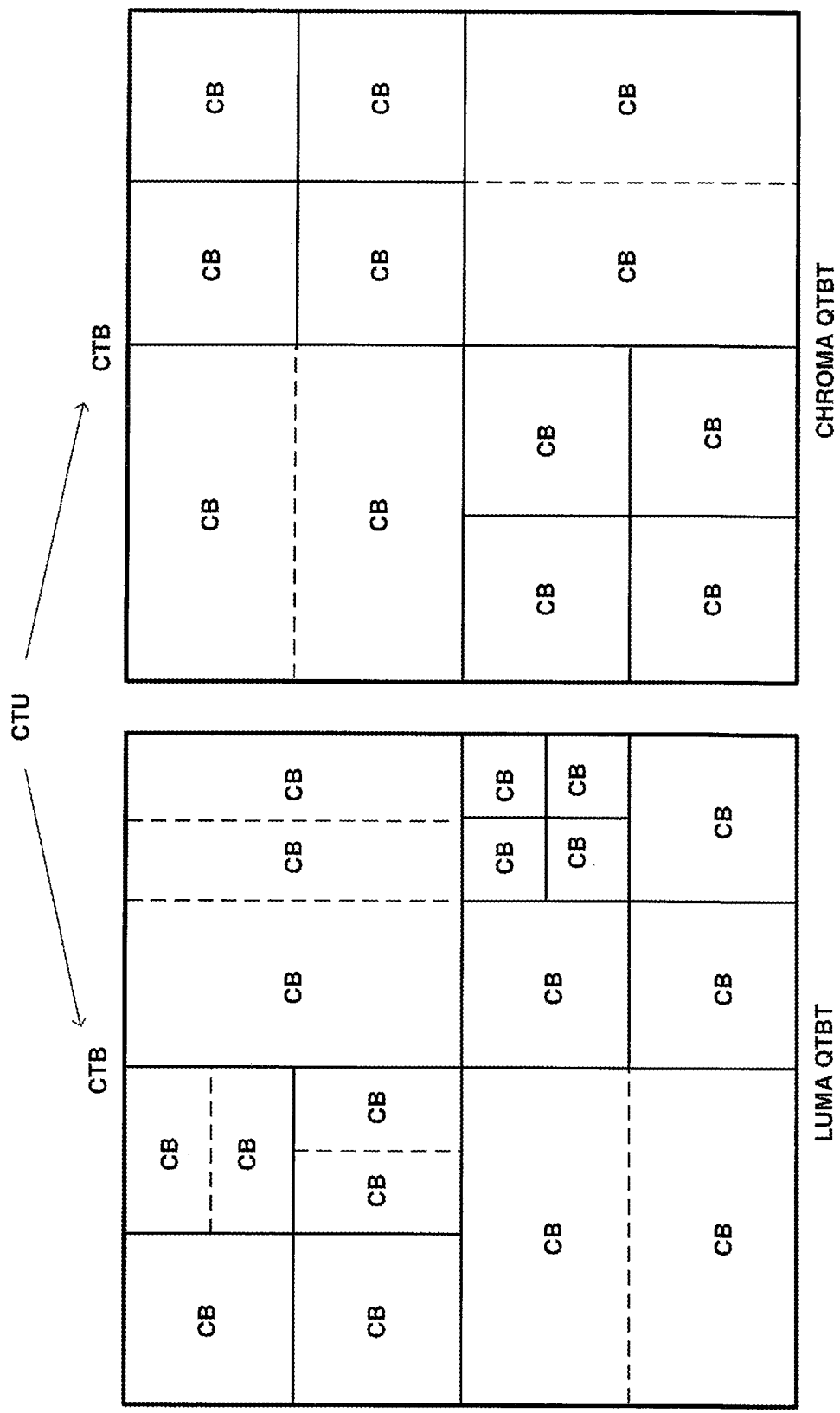
FIG. 3 is a conceptual diagram illustrating video component quad tree binary tree partitioning in accordance with one or more techniques of this disclosure.

QT flag = 1; //Depth 0 syntax
  QT flag = 1; //Depth 1 syntax
    QT flag = 0, BT split = 0; //Depth 2 syntax
    QT flag = 0, BT split = 10; //Depth 2 syntax
      BT split = 0; //Depth 3 syntax
      BT split = 0; //Depth 3 syntax TABLE 1-continued QT flag = 0, BT split = 0; //Depth 2 syntax
    QT flag = 0, BT split = 11; //Depth 2 syntax
      BT split = 0; //Depth 3 syntax
      BT split = 0; //Depth 3 syntax
  QT flag = 0; BT split = 11; //Depth 1 syntax
    BT split = 0; //Depth 2 syntax
    BT split = 11; //Depth 2 syntax
      BT split = 0; //Depth 3 syntax
      BT split = 0; //Depth 3 syntax
  QT flag = 0; BT split = 10; //Depth 1 syntax
    BT split = 0; //Depth 2 syntax
    BT split = 0; //Depth 2 syntax
QT flag = 1; //Depth 1 syntax
  QT flag = 0, BT split = 0; //Depth 2 syntax
  QT flag = 1; //Depth 2 syntax
    QT flag = 0, BT split = 0; //Depth 3 syntax
    QT flag = 0, BT split = 0; //Depth 3 syntax
    QT flag = 0, BT split = 0; //Depth 3 syntax
    QT flag = 0, BT split = 0; //Depth 3 syntax
  QT flag = 0, BT split = 0; //Depth 2 syntax
  QT flag = 0, BT split = 0; //Depth 2 syntax As illustrated in FIG. 2 and Table 1, QT split flag syntax elements and BT split mode syntax elements are associated with a depth, where a depth of zero corresponds to a root of a QTBT and higher value depths correspond to subsequent depths beyond the root. Further, in JEM, luma and chroma channels may have separate QTBT partitions. That is, in JEM luma and chroma channels may be partitioned independently by signaling respective QTBTs. FIG. 3 illustrates an example of a CTU being partitioned according to a QTBT for a luma component and an independent QTBT for chroma components. As illustrated in FIG. 3, when independent QTBTs are used for partitioning a CTU. CBs of the luma component are not required to and do not necessarily align with CBs of chroma components. Currently, in JEM independent QTBT structures are enabled for intra prediction slices. It should be noted that for a slice of video data having an intra type (which may be referred to as an intra prediction slice), only intra prediction modes are enabled and for a slice of video data having an inter type (which may be referred to as an inter prediction slice), both intra prediction modes and inter prediction modes are enabled.

Additionally, it should be noted that JEM includes the following parameters for signaling of a QTBT tree:
  CTU size: the root node size of a quadtree (e.g., 256×256, 128×128, 64×64, 32×32, 16×16 luma samples);
  MinQTSize: the minimum allowed quadtree leaf node size (e.g., 16×16, 8×8 luma samples);
  MaxBTSize: the maximum allowed binary tree root node size, i.e., the maximum size of a leaf quadtree node that may be partitioned by binary splitting (e.g., 64×64 luma samples);
  MaxBTDepth: the maximum allowed binary tree depth, i.e., the lowest level at which binary splitting may occur, where the quadtree leaf node is the root (e.g., 3);
  MinBTSize: the minimum allowed binary tree leaf node size; i.e., the minimum width or height of a binary leaf node (e.g., 4 luma samples).

It should be noted that in some examples, MinQTSize, MaxBTSize, MaxBTDepth, and/or MinBTSize may be different for the different components of video.

In JEM, CBs are used for prediction without any further partitioning. That is, in JEM, a CB may be a block of sample values on which the same prediction is applied. Thus, a JEM QTBT leaf node may be analogous a AB in ITU-T H.265.

Figure 4:
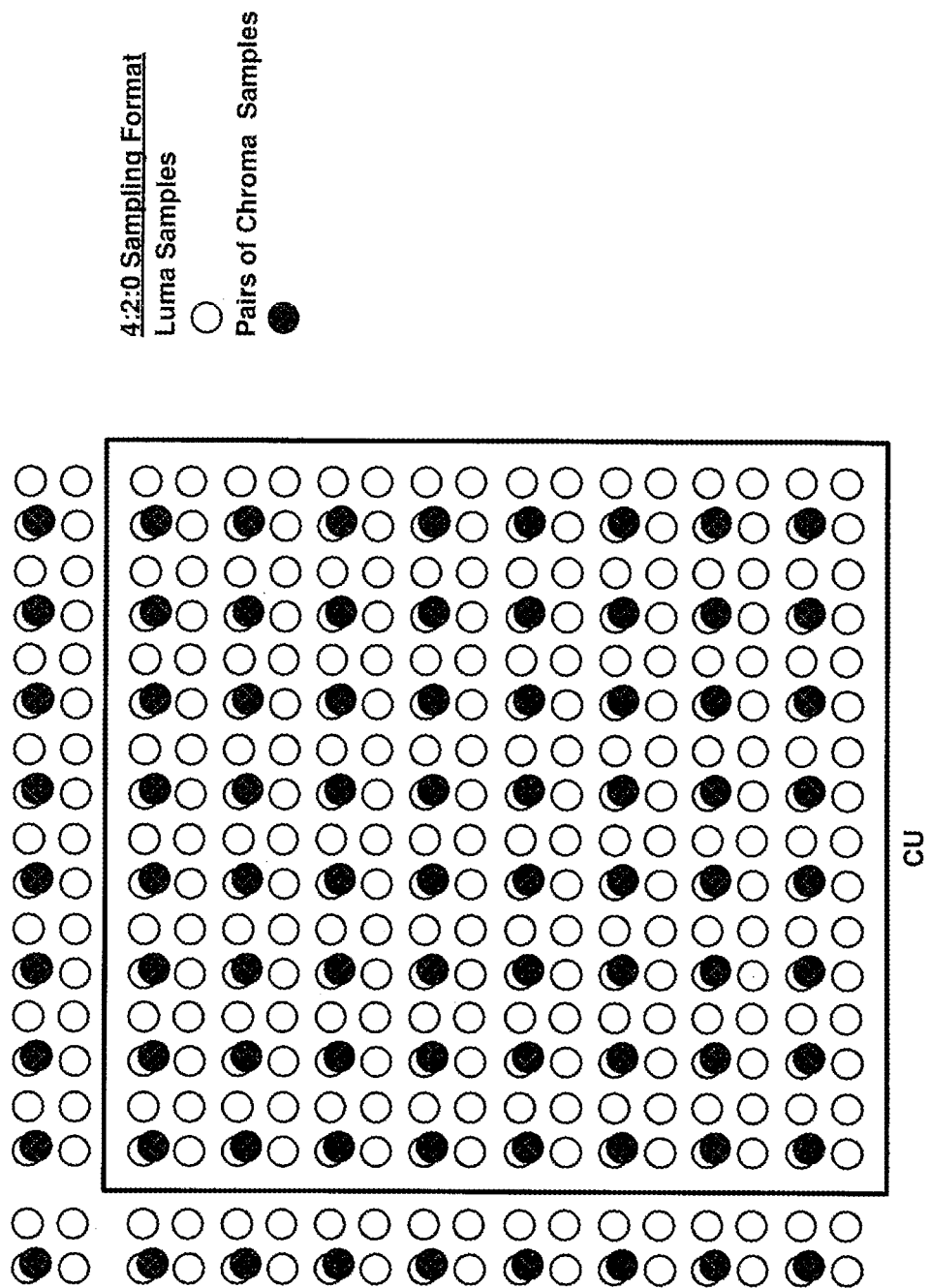
FIG. 4 is a conceptual diagram illustrating an example of a video component sampling format in accordance with one or more techniques of this disclosure.

A video sampling format, which may also be referred to as a chroma format, may define the number of chroma samples included in a CU with respect to the number of luma samples included in a CU. For example, for the 4:2:0 sampling format, the sampling rate for the luma component is twice that of the chroma components for both the horizontal and vertical directions. As a result, for a CU formatted according to the 4:2:0 format, the width and height of an array of samples for the luma component are twice that of each array of samples for the chroma components. FIG. 4 is a conceptual diagram illustrating an example of a coding unit formatted according to a 4:2:0 sample format. FIG. 4 illustrates the relative position of chroma samples with respect to luma samples within a CU. As described above, a CU is typically defined according to the number of horizontal and vertical luma samples. Thus, as illustrated in FIG. 4, a 16×16 CU formatted according to the 4:2:0 sample format includes 16×16 samples of luma components and 8×8 samples for each chroma component. Further, in the example illustrated in FIG. 4, the relative position of chroma samples with respect to luma samples for video blocks neighboring the 16×16 CU are illustrated. For a CU formatted according to the 4:2:2 format, the width of an array of samples for the luma component is twice that of the width of an array of samples for each chroma component, but the height of the array of samples for the luma component is equal to the height of an array of samples for each chroma component. Further, for a CU formatted according to the 4:4:4 format, an array of samples for the luma component has the same width and height as an array of samples for each chroma component.

Figure 5:
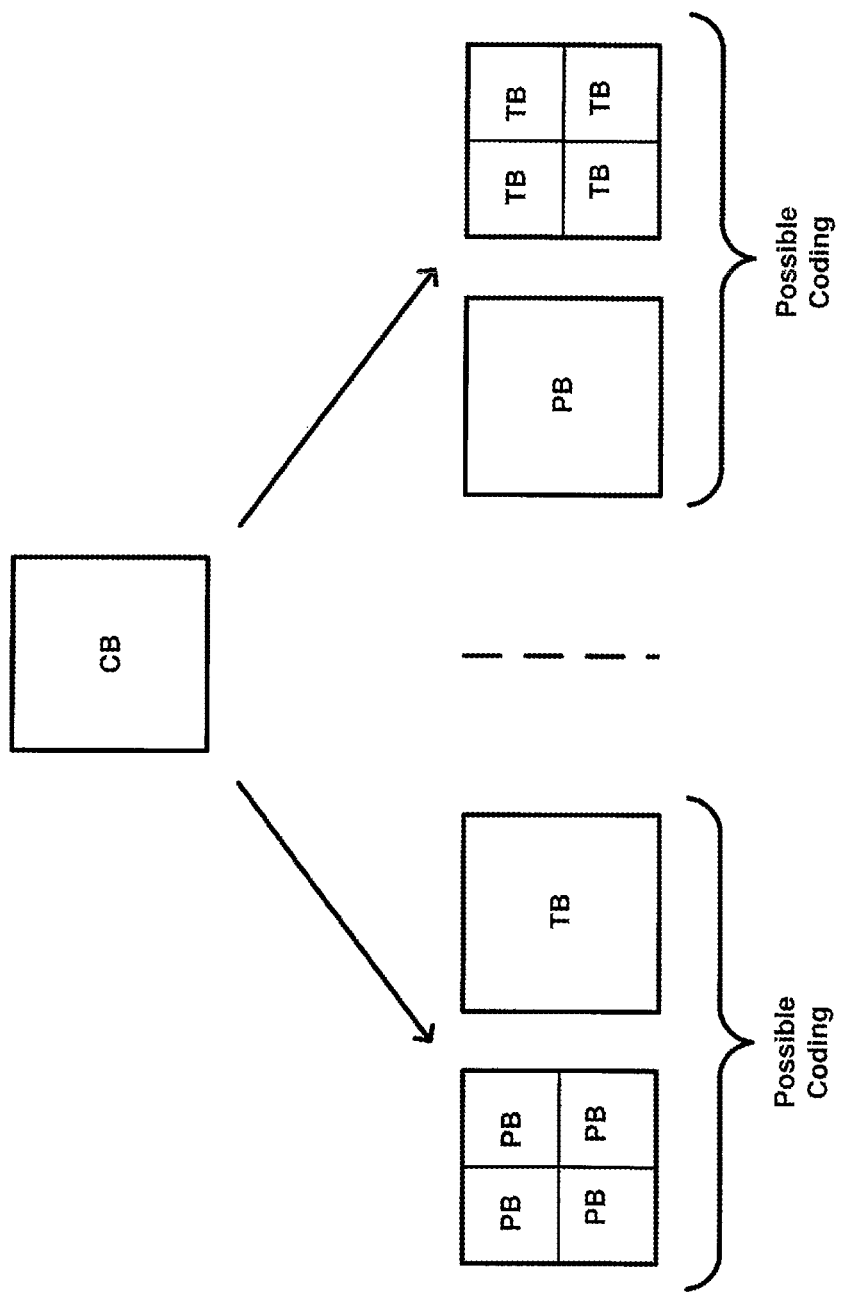
FIG. 5 is a conceptual diagram illustrating possible coding structures for a block of video data according to one or more techniques of this disclosure.

As described above, intra prediction data or inter prediction data is used to produce reference sample values for a block of sample values. The difference between sample values included in a current PB, or another type of picture area structure, and associated reference samples (e.g., those generated using a prediction) may be referred to as residual data. Residual data may include respective arrays of difference values corresponding to each component of video data. Residual data may be in the pixel domain. A transform, such as, a discrete cosine transform (DCT), a discrete sine transform (DST), an integer transform, a wavelet transform, or a conceptually similar transform, may be applied to an array of difference values to generate transform coefficients. In some cases, a transform process may include rotation, and/or performance of one or more one dimensional transforms. It should be noted that in ITU-T H.265, a CU is associated with a transform unit (TU) structure having its root at the CU level. That is, in ITU-T H.265, an array of difference values may be sub-divided for purposes of generating transform coefficients (e.g., four 8×8 transforms may be applied to a 16×16 array of residual values). For each component of video data, such sub-divisions of difference values may be referred to as Transform Blocks (TBs). It should be noted that in ITU-T H.265, TBs are not necessarily aligned with PBs. FIG. 5 illustrates examples of alternative PB and TB combinations that may be used for coding a particular CB. Further, it should be noted that in ITU-T H.265, TBs may have the following sizes 4×4, 8×8, 16×16, and 32×32.

It should be noted that in JEM, residual values corresponding to a CB are used to generate transform coefficients without further partitioning. That is, in JEM a QTBT leaf node may be analogous to both a PB and a TB in ITU-T H.265. It should be noted that in JEM, a core transform and a subsequent secondary transforms may be applied (in the video encoder) to generate transform coefficients. For a video decoder, the order of transforms is reversed. Further, in JEM, whether a secondary transform is applied to generate transform coefficients may be dependent on a prediction mode.

A quantization process may be performed on transform coefficients or residual sample values directly, e.g., in the case of palette coding quantization. Quantization ap-proximates transform coefficients by amplitudes restricted to a set of specified values. Quantization essentially scales transform coefficients in order to vary the amount of data required to represent a group of transform coefficients. Quantization may include division of transform coefficients (or resulting values of addition of an offset value to transform coefficients) by a quantization scaling factor and any associated rounding functions (e.g., rounding to the nearest integer). Quantized transform coefficients may be referred to as coefficient level values. Inverse quantization (or "dequantization") may include multiplication of level values by the quantization scaling factor, and any reciprocal rounding or offset addition operations. It should be noted that as used herein the term quantization process in some instances may refer to division by a scaling factor to generate level values and multiplication by a scaling factor to recover transform coefficients in some instances. That is, a quantization process may refer to quantization in some cases and inverse quantization in some cases. Further, it should be noted that although in some of the examples below quantization processes are described with respect to arithmetic operations associated with decimal notation, such descriptions are for illustrative purposes and should not be construed as limiting. For example, the techniques described herein may be implemented in a device using binary operations and the like. For example, multiplication and division operations described herein may be implemented using bit shifting operations and the like.

With respect to the equations used herein, the following arithmetic operators may be used:

| | |
|---|---|
| + | Addition |
| − | Subtraction |
| * | Multiplication, including matrix multiplication |
| $x^y$ | Exponentiation. Specifies x to the power of y. In other contexts, such notation is used for superscripting not intended for interpretation as exponentiation. |
| / | Integer division with truncation of the result toward zero. For example, 7/4 and −7/−4 are truncated to 1 and −7/4 and 7/−4 are truncated to −1. |
| ÷ | Used to denote division in mathematical equations where no truncation or rounding is intended. |
| $\frac{x}{y}$ | Used to denote division in mathematical equations where no truncation or rounding is intended. | x % y Modulus. Remainder of x divided by y, defined only for integers x and y with x >= 0 and y > 0.

Further, the following logical operators may be used:
x&&y Boolean logical "and" of x and y
x||y Boolean logical "or" of x and y
!Boolean logical "not"
x?y:z If x is TRUE or not equal to 0, evaluates to the value of y; otherwise, evaluates to the value of z.

Further, the following relational operators may be used:

| | |
|---|---|
| > | Greater than |
| >= | Greater than or equal to |
| < | Less than |
| <= | Less than or equal to |

| | |
|---|---|
| == | Equal to |
| != | Not equal to |

Further, the following bit-wise Operators may be used:

| | |
|---|---|
| & | Bit-wise "and". When operating on integer arguments, operates on a two's complement representation of the integer value. When operating on a binary argument that contains fewer bits than another argument, the shorter argument is extended by adding more significant bits equal to 0. |
| \| | Bit-wise "or". When operating on integer arguments, operates on a two's complement representation of the integer value. When operating on a binary argument that contains fewer bits than another argument, the shorter argument is extended by adding more significant bits equal to 0. |
| ^ | Bit-wise "exclusive or". When operating on integer arguments, operates on a two's complement representation of the integer value. When operating on a binary argument that contains fewer bits than another argument, the shorter argument is extended by adding more significant bits equal to 0. |
| x >> y | Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation. |
| x << y | Arithmetic left shift of a two's complement integer representation of x by y binary digits. This function is defined only for non-negative integer values of y. Bits shifted into the least significant bits (LSBs) as a result of the left shift have a value equal to 0. |

Further, the following mathematical functions may be used:

$$\text{Log2}(x) \text{ the base} - 2 \text{ logarithm of } x;$$

$$\text{Min}(x, y) = \begin{cases} x; & x <= y \\ y; & x > y \end{cases};$$

$$\text{Max}(x, y) = \begin{cases} x; & x >= y \\ y; & x < y \end{cases}$$

Figure 6A:
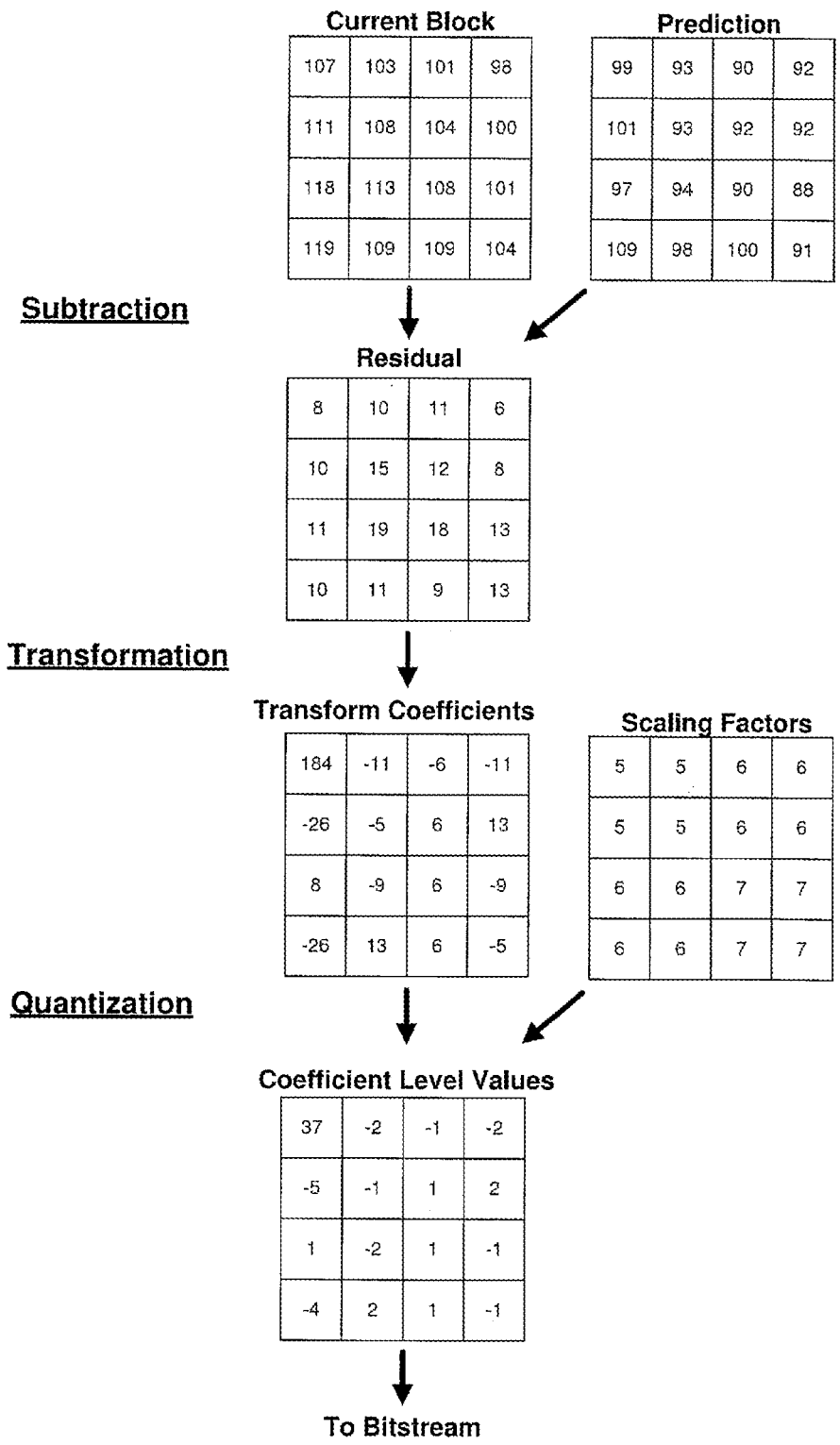
FIG. 6A is a conceptual diagram illustrating example of coding a block of video data in accordance with one or more techniques of this disclosure.
Figure 6B:
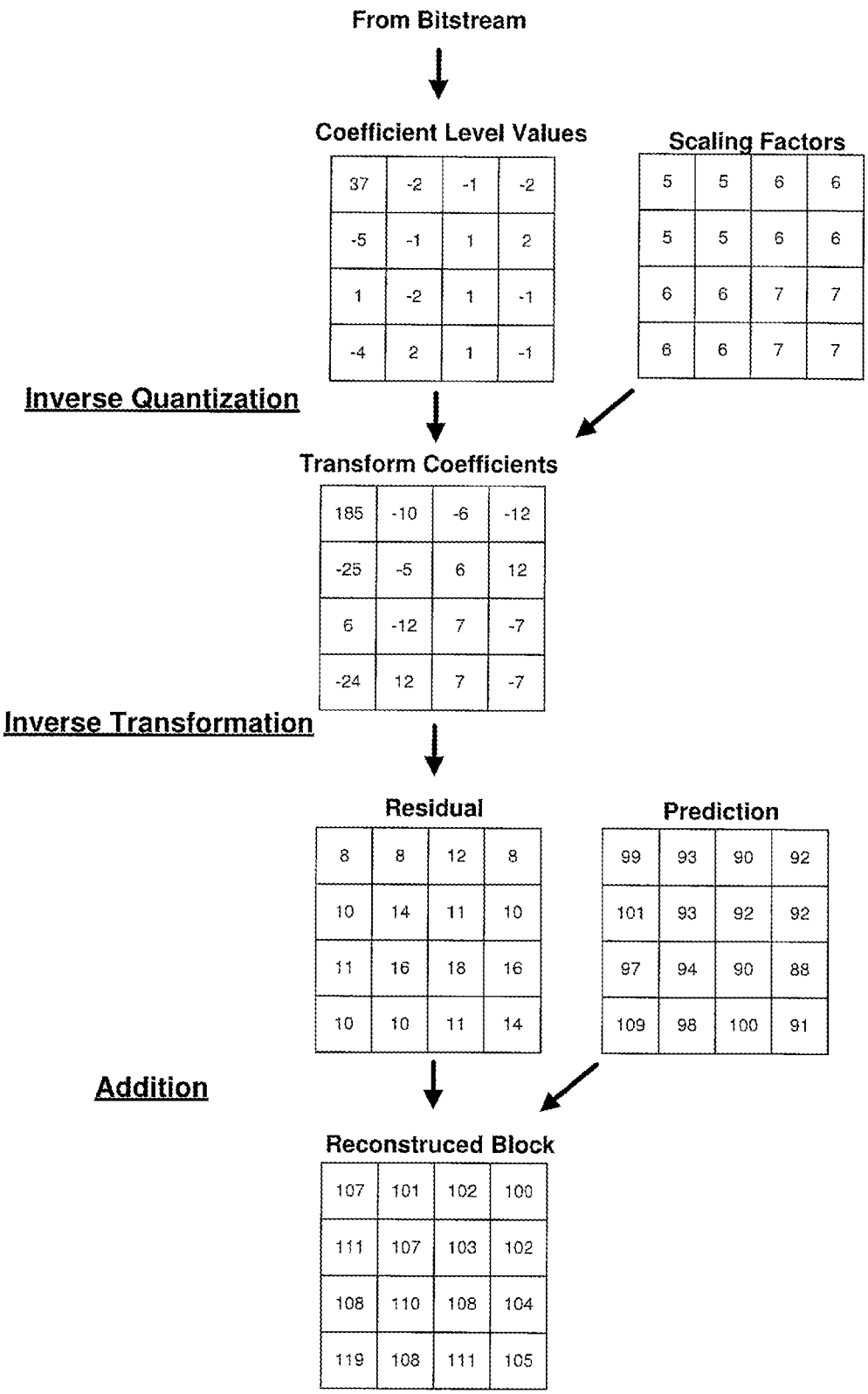
FIG. 6B is a conceptual diagram illustrating example of coding a block of video data in accordance with one or more techniques of this disclosure.

FIGS. 6A-6B are conceptual diagrams illustrating examples of coding a block of video data. As illustrated in FIG. 6A, a current block of video data (e.g., a CB corresponding to a video component) is encoded by generating a residual by subtracting a set of prediction values from the current block of video data, performing a transformation on the residual, and quantizing the transform coefficients to generate level values. As illustrated in FIG. 6B, the current block of video data is decoded by performing inverse quantization on level values, performing an inverse transform, and adding a set of prediction values to the resulting residual. It should be noted that in the examples in FIGS. 6A-6B, the sample values of the reconstructed block differs from the sample values of the current video block that is encoded. In this manner, coding may said to be lossy. However, the difference in sample values may be considered acceptable or imperceptible to a viewer of the reconstructed video.

Further, as illustrated in FIGS. 6A-6B, coefficient level values are generated using an array of scaling factors. In ITU-T H.265, an array of scaling factors is generated by selecting a scaling matrix and multiplying each entry in the scaling matrix by a quantization scaling factor. In ITU-T H.265, a scaling matrix is selected based in part on a prediction mode and a color component, where scaling matrices of the following sizes are defined: 4×4, 8×8, 16×16, and 32×32. It should be noted that in some examples, a scaling matrix may provide the same value for each entry (i.e., all coefficients are scaled according to a single value). In ITU-T H.265, the value of a quantization scaling factor, may be determined by a quantization parameter, QP. In ITU-T H.265, for a bit-depth of 8-hits, the QP can take 52 values from 0 to 51 and a change of 1 for QP generally corresponds to a change in the value of the quantization scaling factor by ap-proximately 12%. II should be noted that more generally, in ITU-T H.265, the valid range of QP values for a source bit-depth is: −6*(bitdepth-8) to +51 (inclusive). Thus, for example, in the case where the hit-depth is 10-hits, QP can take 64 values from −12 to 51, which may be mapped to values 0 to 63 during dequantization.

Further, in ITU-T H.265, a QP value for a set of transform coefficients may be derived using a predictive quantization parameter value (which may be referred to as a predictive QP value or a QP predictive value) and an optionally signaled quantization parameter delta value (which may be referred to as a QP delta value or a delta QP value). In ITU-T H.265, a quantization parameter may be updated for each CU and a respective quantization parameter may be derived for each of the luma and chroma channels. In ITU-T H.265, for a current CU, a predictive QP value is inherited for the CU (i.e., a QP signaled at the slice level or a QP from a previous CU) and a delta QP value may be optionally signaled for each TU within the CU. For the luma channel, the QP for each luma TB is the sum of the predictive QP value and any signaled delta QP value. Further, for most profiles in ITU-T H.265, for the chroma channels of the current CU, the chroma QP is a function of the QP determined for the luma channel and chroma QP offsets signaled in a slice header and/or chroma QP offsets signaled a picture parameter set (PPS).

As described above, in ITU-T H.265, a delta QP value may be optionally signaled for each TU within the CU. In particular, in ITU-T H.265, a quantization group size is used to determine if a delta QP can be signaled for a particular TU. For example, a video encoder may select a CTU size of 64×64 and a quantization group size of 32×32. In this case, if the CTU is partitioned into four 32×32 CUs having respective 32×32 TUs, then a delta QP may be signaled for each TU. However, if the four 32×32 CUs are further partitioned into smaller TUs (e.g., 8×8, 16×16), then a delta QP is only sent for the first 8×8 TU in each 32×32 CU region. It should be noted that in ITU-T H.265, the TU structure aligns TBs for each luma and chroma channels. That is, in ITU-T H.265, a TB for a component (e.g., a chroma component) directly corresponds to a TB of another component. In ITU-T H.265, a difference value is signaled in the PPS (i.e., syntax element diff_cu_qp_delta_depth) to indicate the difference between the luma CTB size and the quantization group size. For example, if the CTB size is 64×64 and the quantization group size is 16×16, a difference value (in logarithmic notation) is signaled to indicate the quantization group size. It should be noted that in ITU-T H.265, a quantization group is always square.

As described above, quantization may include division of transform coefficients by a quantization scaling factor and any associated rounding functions (e.g., rounding to the nearest integer). In some cases, quantization may result in level values of zero, e.g., for a relatively high quantization parameter. A non-zero level value may be described as significant. In ITU-T H.265, a coded block flag (cbf) may be signaled for each component to indicate whether a transform block includes one or more transform coefficient levels that are not equal to 0 (e.g., coded block flags, cbf_luma, cbf_cb, and cbf_cr). Further, in ITU-T H.265 a cbf may be signaled at a root (root_cbf) to indicate the presence of cbf_luma, cbf_ch, and chf_cr and thus, if a block corresponding to the root does not include an significant coefficients. In ITU-T H.265, the signaling of a delta QP value is conditioned on one of cbf_luma, cbf_cb, or cbf_cr (cbfChroma in the logical expression cbf_cb OR cbf_cr) indicating that one or more transform coefficient levels for a component are not equal to 0 (i.e., delta QP values may be signaled when a TU includes significant level values). That is, syntax indicating a delta QP value, delta_qp( ), may be present in TU unit syntax, as provided in the example of pseudo-syntax of Table 2.

TABLE 2 transform_unit( )
...
if( cbfLuma || cbfChroma ) {
...
delta_qp( )
...
}
...

With respect to the delta_qp( ) syntax, ITU-T H.265 includes the following syntax illustrated in Table 3:

TABLE 3 delta_qp( ) {
  if( cu_qp_delta_enabled_flag && !IsCuQpDeltaCoded ) {
    cu_qp_delta_abs
    if( cu_qp_delta_abs)
      cu_qp_delta_sign_flag
  }
}

Where cu_qp_delta_enabled_flag is defined as follows in ITU-T H.265:
cu_qp_delta_enabled_flag equal to 1 specifies that . . . cu_qp_delta_abs may be present in the transform unit syntax . . . cu_qp_delta_enabled_flag equal to 0 specifies that . . . cu_qp_delta_abs is not present in the transform unit syntax . . . .

Syntax elements cu_qp_delta_abs and eu_qp_delta_sign_flag are described in further detail below. IsCuQpDeltaCoded is also set to 1 when the first non-zero TU of a quantization group is signaled and delta_qp value is received. IsCuQpDeltaCoded is set to 0 at the start of a new quantization group. The start of a new quantization group is determined based on quantization group size. For example, if the quantization group size is the same as CTU size then IsCuQpDeltaCoded is set to 0 at the start of a CTU.

The dequantization process defined in ITU-T H.265 for each entry in an x by y array may be summarized as follows:

$$d[x][y] = ((\text{TransCoeffLevel}[x][y] * m[x][y] * \text{levelScale}[qP\%6] << (qP/6)) + (1 << (bd\text{Shift}-1))) >> bd\text{Shift}$$

where
  d[x][y] is a resulting transform coefficient;
  TransCoeffLevel[x][y] is a coefficient level value;
  m[x][y] is a scaling matrix;
  levelScale[k]={40, 45, 51, 57, 64, 72} with k=0 . . . 5;
  qP is the quantization parameter;

$$bd\text{Shift} = \text{BitDepth} + \text{Log } 2(nTbS) + 10;$$

BitDepth is the bit depth of the corresponding component; and
  nTbS specifies the size of the corresponding transform block.

It should be noted that the transform coefficient at d[0][0] may be referred to as the DC transform coefficient and the other transform coefficients in the array may be referred to as the AC transform coefficients in some cases (e.g., for DCT).

As described above, in ITU-T H.265, for the luma component, the QP for each luma TB is the sum of the predictive QP value and any signaled delta QP value. In particular, for a current CU, a video decoder may derive the value of the luma QP based on a prediction derived from the QP values of neighboring CUs. That is, in ITU-T H.265, the luma QP, Qp'Y, is derived as follows:

$$Qp'_Y = Qp_Y + QpBd\text{Offset}_Y;$$

where $$Qp_Y = ((qP_{Y\_PRED} + CuQp\text{DeltaVal} + 52 - 2*QBd\text{Offset}_Y) \% (52 + QpBd\text{Offset}_Y)) - QpBd\text{Offset}_Y;$$

where $$qP_{Y\_PRED} = (qP_{Y\_A} + qP_{Y\_B} + 1) >> 1;$$

where
  qP$_{Y\_A}$ in most cases, is set equal to the Qp$_Y$ of the coding unit to the left of the current CU;
  qP$_{Y\_B}$ in most cases, is set equal to the Qp$_Y$ of the coding unit above the current CU;
where $$CuQp\text{DeltaVal} = cu\_qp\_delta\_abs * (1 - 2*cu\_qp\_delta\_sign\_flag);$$

where
  cu_qp_delta_abs is a syntax element that is conditionally included in a bitstream at the Transform Unit Level that specifies the absolute value of the difference CuQpDeltaVal between the luma quantization parameter of the current coding unit and its prediction.
  cu_qp_delta_sign_flag is a syntax element that is conditionally included in a bitstream at the Transform Unit Level that specifies the sign of CuQpDeltaVal as follows:
    If cu_qp_delta_sign_flag is equal to 0, the corresponding CuQpDeltaVal has a positive value.
    Otherwise (cu_qp_delta_sign_flag is equal to 1), the corresponding CuQpDeltaVal has a negative value.
where $QpBd\text{Offset}_Y=6*\text{bit\_depth\_luma\_minus8};$ where
   bit_depth_luma_minus8 is a syntax element included in a bitstream at the sequence level that specifies the value of the luma quantization parameter range offset QpBdOffsetY and shall be in the range of 0 to 8, inclusive.

It should be noted that, in some cases, qPY_A and qPY_B may be set equal to a variable $qP_{Y\_PREV}$, for example, when a neighboring block is unavailable. In ITU-T H.265, $qP_{Y\_PREV}$ is set equal to the QpY of the last coding unit in the previous quantization group in decoding order or is set equal to $\text{SliceQp}_Y$, which is determined based on the syntax element slice_qp_delta signaled in the bitstream at the slice header,
where
   slice_qp_delta specifies the initial value of QpY to be used for the coding blocks in the slice until modified by the value of CuQpDeltaVal in the coding unit layer. The initial value of the QpY quantization parameter for the slice, SliceQpY, is derived as follows:

$\text{Slice}QpY=26+\text{init\_qp\_minus26}+\text{slice\_qp\_delta}$

The value of SliceQpY shall be in the range of −QpBdOffsetY to +51, inclusive.

As described above, currently, in JEM, independent QTBT partitioning for luma and chroma channels are enabled for intra prediction slices and a QTBT leaf node may be analogous to a TB in ITU-T H.265. In JEM, in the cases where independent QTBT partitioning are not enabled, (i.e., inter slices), syntax indicating a delta QP value, is present in CU unit syntax, in a similar manner, as provided in ITU-T H.265, as described above with respect to the example of pseudo-syntax of Table 2. In JEM, in the cases where independent QTBT structures are enabled, (i.e., for intra slices), when luma and chroma channels have separate partition trees, QP values are signaled independently for luma and chroma components. In particular, two sets of syntax indicating a delta QP, (i.e., a delta_qp( ) for luma and a delta_qp( ) for chroma) are independently conditioned respectively on cbfLuma and cbfChroma. That is, for each independent QTBT partitioning, delta_qp( ) may be present as provided in the example of pseudo-syntax of Table 4A and Table 4B.

TABLE 4A

```
coding_unit( )
...
    if( cbfLuma) {
        ...
        delta_qp( )
        ...
    }
    ...
```

TABLE 4B

```
coding_unit( )
...
    if( cbfChroma) {
        ...
        delta_qp( )
        ...
    }
    ...
```

Referring again to FIG. 6A, quantized transform coefficients are coded into a bitstream. Quantized transform coefficients and syntax elements (e.g., syntax elements indicating a coding structure for a video block) may be entropy coded according to an entropy coding technique. Examples of entropy coding techniques include content adaptive variable length coding (CAVLC), context adaptive binary arithmetic coding (CABAC), probability interval partitioning entropy coding (PIPE), and the like. Entropy encoded quantized transform coefficients and corresponding entropy encoded syntax elements may form a compliant bitstream that can be used to reproduce video data at a video decoder. An entropy coding process may include performing a hinarization on syntax elements. Binarization refers to the process of converting a value of a syntax value into a series of one or more bits. These bits may be referred to as "bins." Binarization is a lossless process and may include one or a combination of the following coding techniques: fixed length coding, unary coding, truncated unary coding, truncated Rice coding, Golomb coding, k-th order exponential Golomb coding, and Golomb-Rice coding. For example, hinarization may include representing the integer value of 5 for a syntax element as 00000101 using an 8-hit fixed length binarization technique or representing the integer value of 5 as 11110 using a unary coding hinarization technique. As used herein each of the terms fixed length coding, unary coding, truncated unary coding, truncated Rice coding, Golomh coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard, for example, ITU-T H.265. An entropy coding process further includes coding bin values using lossless data compression algorithms. In the example of a CABAC, for a particular bin, a context model may be selected from a set of available context models associated with the bin. In some examples, a context model may be selected based on a previous bin and/or values of previous syntax elements. A context model may identify the probability of a bin having a particular value. For instance, a context model may indicate a 0.7 probability of coding a 0-valued bin and a 0.3 probability of coding a 1-valued bin. It should be noted that in some cases the probability of coding a 0-valued bin and probability of coding a 1-valued bin may not sum to 1. After selecting an available context model, a CABAC entropy encoder may arithmetically code a bin based on the identified context model. The context model may be updated based on the value of a coded bin. The context model may be updated based on an associated variable stored with the context, e.g., adaptation window size, number of bins coded using the context. It should be noted, that according to ITU-T H.265, a CABAC entropy encoder may be implemented, such that some syntax elements may be entropy encoded using arithmetic encoding without the usage of an explicitly assigned context model, such coding may be referred to as bypass coding.

As described above, intra prediction data or inter prediction data may associate an area of a picture (e.g., a PB or a CB) with corresponding reference samples. For intra prediction coding, an intra prediction mode may specify the location of reference samples within a picture. In ITU-T H.265, defined possible intra prediction modes include a planar (i.e., surface fitting) prediction mode (predMode: 0), a DC (i.e., flat overall averaging) prediction mode (predMode: 1), and 33 angular prediction modes (predMode: 2-34). In JEM, defined possible intra-prediction modes include a planar prediction mode (predMode: 0), a DC prediction mode (predMode: 1), and 65 angular prediction modes (predMode: 2-66). It should be noted that planar and DC prediction modes may be referred to as non-directional prediction modes and that angular prediction modes may be referred to as directional prediction modes. It should be noted that the techniques described herein may be generally applicable regardless of the number of defined possible prediction modes.

For inter prediction coding, a motion vector (MV) identifies reference samples in a picture other than the picture of a video block to be coded and thereby exploits temporal redundancy in video. For example, a current video block may be predicted from reference block(s) located in previously coded frame(s) and a motion vector may be used to indicate the location of the reference block. A motion vector and associated data may describe, for example, a horizontal component of the motion vector, a vertical component of the motion vector, a resolution for the motion vector (e.g., one-quarter pixel precision, one-half pixel precision, one-pixel precision, two-pixel precision, four-pixel precision), a prediction direction and/or a reference picture index value. Further, a coding standard, such as, for example ITU-T H.265, may support motion vector prediction. Motion vector prediction enables a motion vector to be specified using motion vectors of neighboring blocks. Examples of motion vector prediction include advanced motion vector prediction (AMVP), temporal motion vector prediction (TMVP), so-called "merge" mode, and "skip" and "direct" motion inference. Further, JEM supports advanced temporal motion vector prediction (ATMVP) and Spatial-temporal motion vector prediction (STMVP).

Figure 7:
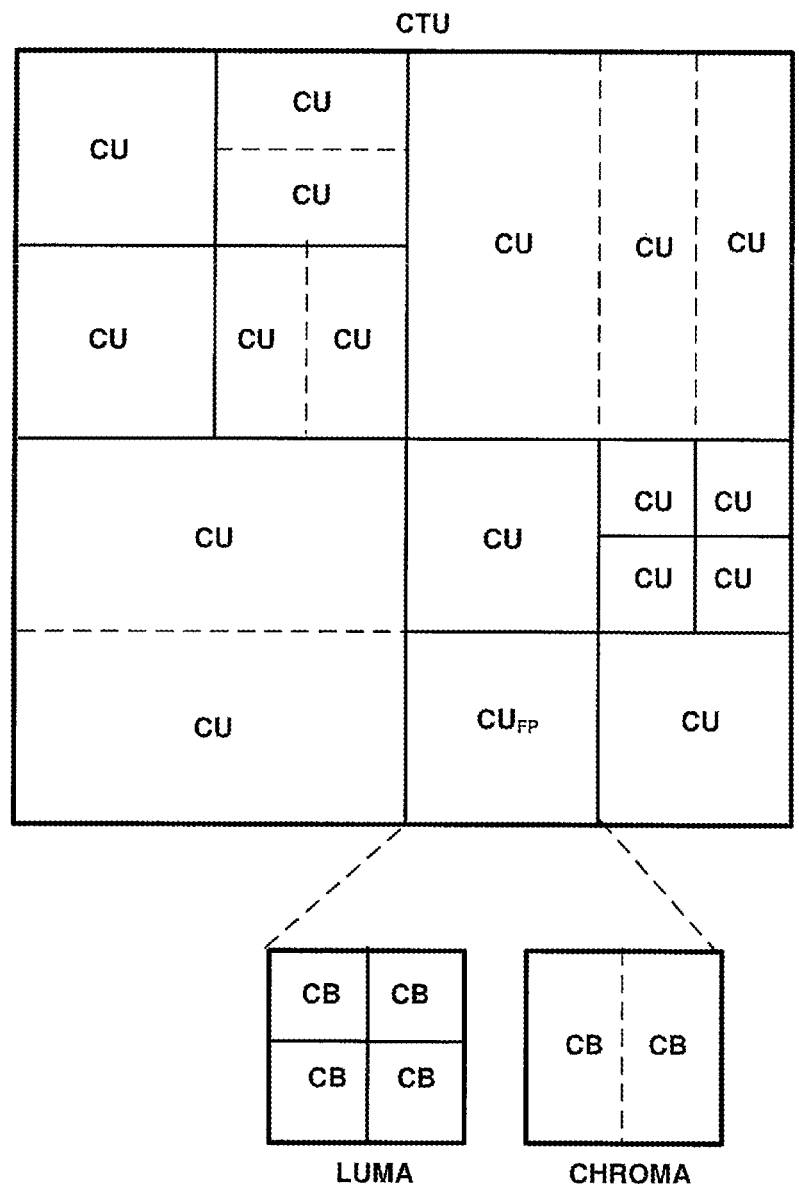
FIG. 7 is a conceptual diagram illustrating video component partitioning in accordance with one or more techniques of this disclosure.

As described above, in JEM, luma and chroma channels may be partitioned independently using independent QTBTs. In some cases, it may be useful to enable partitioning of CTUs such that, luma and chroma channels have a common partitioning structure up to a CU level and one or both of the luma and chroma channels are enabled to be further partitioned. For example, commonly assigned U.S. Provision Patent Application No. 62/598,956, filed Dec. 14, 2017 describes techniques for using a common partitioning structure up to the CU level, and each of the luma and chroma channels may be further partitioned if a CU condition is satisfied. For example, if the CU is an intra predicted CU included an inter prediction slice, the CU may be further partitioned for purposes of generating predictions corresponding to the further partitions. FIG. 7 illustrates an example where for a CTU, luma and chroma channels have a common partitioning structure up to the CU level, and each of the luma and chroma channels of a CU (i.e., $CU_{FP}$) are further partitioned. It should be noted with respect to FIG. 7, for the sake of simplicity of illustration, only one of the CUs in the CTU is illustrated as being further partitioned. In the example illustrated in FIG. 7, each illustrated CB may be a block of sample values for which the same prediction is applied. That is, the CBs illustrated in FIG. 7 may be analogous to PBs in ITU-T H.265. However, it should be noted that the CBs in FIG. 7 are not limited to the PB shapes defined in ITU-T H.265 (i.e., the CBs may have shapes resulting from QTBT partitioning).

Figure 8:
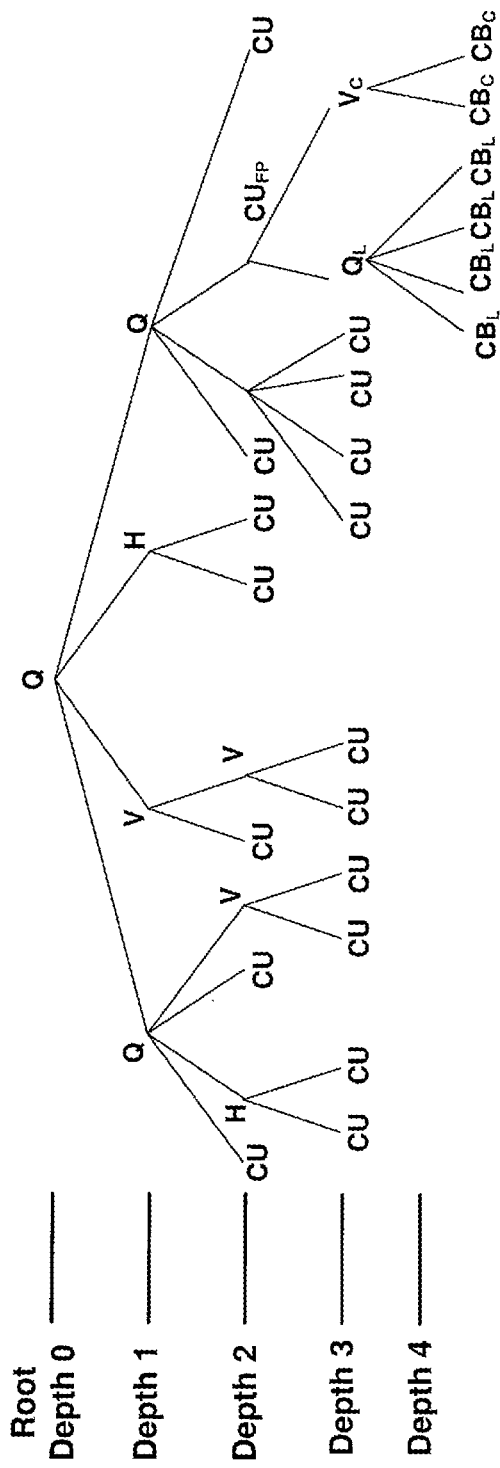
FIG. 8 is a conceptual diagram illustrating video component quad tree binary tree partitioning in accordance with one or more techniques of this disclosure.

Referring to FIG. 7, the luma channel $CU_{FP}$ of is further partitioned according to a quad split and the chroma channel of $CU_{FP}$ is further partitioned according to a vertical split. FIG. 8 is a conceptual diagram illustrating an example of a QTBT corresponding to the example QTBT partition illustrated in FIG. 7. As illustrated in FIG. 8, once a CU associated with a common partitioning is reached, QTBTs may be signaled for each of the luma channel and chroma channel. Table 5 illustrates an example of pseudo-syntax that may be used to signal the shared QTBT and the independent QTBTs for the luma and chroma channels for the example illustrated FIG. 8. It should be noted that with respect to Table 5, for the purpose of illustration FI_Part flag merely illustrates a condition on which further independent partitioning may be based (e.g., a prediction mode, etc.). It should be noted that in Table 5, as described above with respect to Table 1, QT flag=0, indicates no QT split; QT flag=1 indicates a QT split; BT flag=0, indicates no BT split; BT flag=1, indicates a vertical BT split; and BT flag=2, indicates a horizontal BT split. Further, signaling in the example illustrated in Table 5 is based on a so-called z-scan.

TABLE 5

```
QT flag = 1; //Depth 0 syntax
    QT flag = 1; //Depth 1 syntax
        QT flag = 0, BT split = 0; //Depth 2 syntax
            FI_Part = FALSE // FI_Part Condition
        QT flag = 0, BT split = 2; //Depth 2 syntax
            BT split = 0; //Depth 3 syntax
                FI_Part = FALSE // FI_Part Condition
            BT split = 0; //Depth 3 syntax
                FI_Part = FALSE // FI_Part Condition
        QT flag = 0, BT split = 0; //Depth 2 syntax
            FI_Part = FALSE // FI_Part Condition
        QT flag = 0, BT split = 1; //Depth 2 syntax
            BT split = 0; //Depth 3 syntax
                FI_Part = FALSE // FI_Part Condition
            BT split = 0; //Depth 3 syntax
                FI_Part = FALSE // FI_Part Condition
    QT flag = 0; BT split = 1; //Depth 1 syntax
        BT split = 0; //Depth 2 syntax
            FI_Part = FALSE // FI_Part Condition
        BT split = 1; //Depth 2 syntax
            BT split = 0; //Depth 3 syntax
                FI_Part = FALSE // FI_Part Condition
            BT split = 0; //Depth 3 syntax
                FI_Part = FALSE //FI_Part Condition
    QT flag = 0; BT split = 2; //Depth 1 syntax
        BT split = 0; //Depth 2 syntax
            FI_Part = FALSE // FI_Part Condition
        BT split = 0; //Depth 2 syntax
            FI_Part = FALSE // FI_Part Condition
    QT flag = 1; //Depth 1 syntax
        QT flag = 0, BT split 0; //Depth 2 syntax
            FI_Part = FALSE // FI_Part Condition
        QT flag = 1; //Depth 2 syntax
            QT flag = 0, BT split = 0; //Depth 3 syntax
                FI_Part = FALSE // FI_Part Condition
            QT flag = 0, BT split 0; //Depth 3 syntax
                FI_Part = FALSE // FI_Part Condition
            QT flag = 0, BT split = 0; //Depth 3 syntax
                FI_Part = FALSE // FI_Part Condition
            QT flag = 0, BT split = 0; //Depth 3 syntax
                FI_Part = FALSE // FI_Part Condition
        QT flag = 0, BT split = 0; //Depth 2 syntax
            FI_Part = TRUE // FI_Part Condition
            QT Luma flag = 1;
                QT Luma flag = 0; BT Luma split = 0;
                QT Luma flag = 0; BT Luma split = 0;
                QT Luma flag = 0; BT Luma split = 0;
                QT Luma flag = 0; BT Luma split = 0;
            QT Chroma flag = 0, BT Chroma split = 1;
                BT Chroma split = 0;
                BT Chroma split = 0.
        QT flag = 0, BT split 0; //Depth 2 syntax
            FI_Part = FALSE // FI_Part Condition
```

As illustrated in Table 5, upon reaching a coding unit (BT split=0), the further independent partitioning condition is determined. If the condition is false, no further partitioning signaling occurs for the coding unit. If the condition is true, a QTBT is signaled for the luma channel and a QTBT is signaled for the chroma channel.

Table 6 illustrates a general case of signaling that occurs for a coding unit. In some examples, further partitioning may be disabled for one of the luma channel or the chroma channel. In such examples, either of coding_tree_unit_luma( ) or coding_tree_unit_chroma( ) in Table 6 may be replaced with coding_block_luma( ) or coding_block_chroma( ).

TABLE 6

```
coding_unit( )
    FI_part_flag
        if( FI_part_flag == TRUE )
            coding_tree_unit_luma( )
            coding_tree_unit_chroma( )
```

Figure 9:
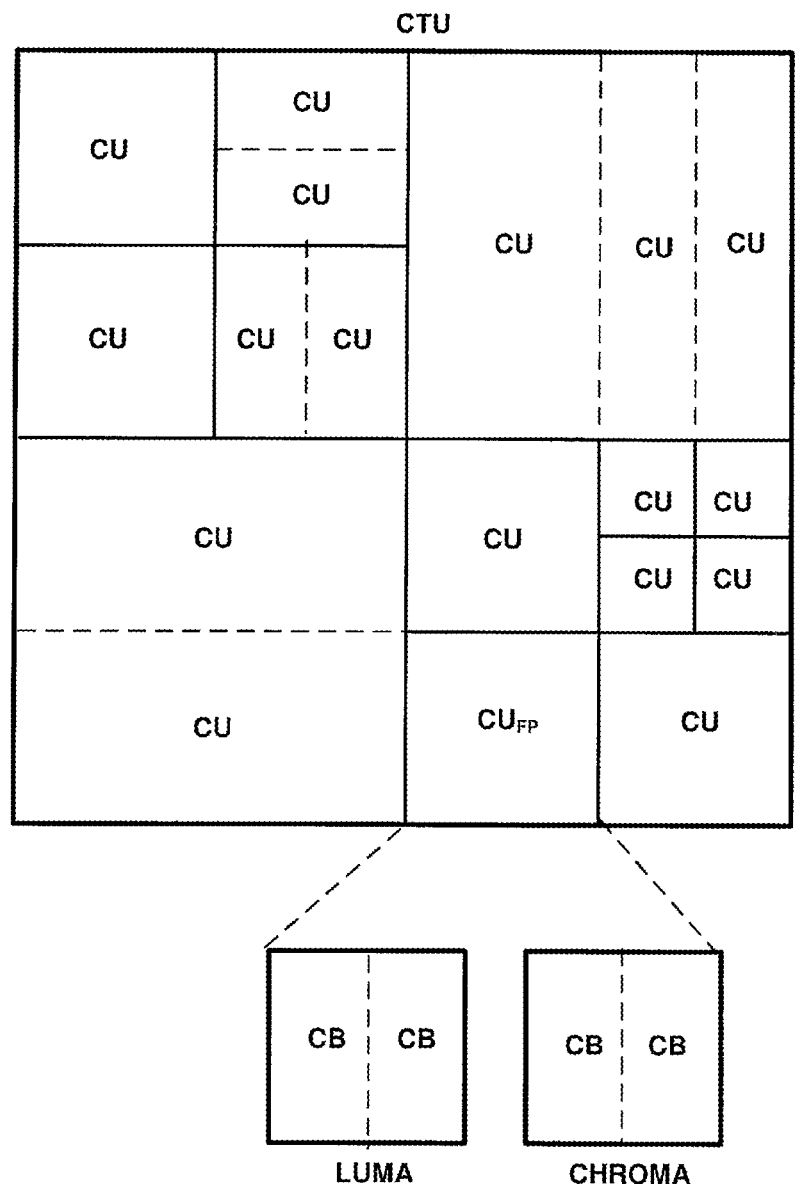
FIG. 9 is a conceptual diagram illustrating video component partitioning in accordance with one or more techniques of this disclosure.

Further, various techniques may be used to determine whether and how the luma and/or chroma channels may be further partitioned beyond the CU. Thus, in Table 6, coding_tree_unit_luma( ) and coding_tree_unit_chroma( ) may provide semantics that enables various types of partitioning. In one example, the luma and chroma channels may be further partitioned beyond the CU according to separate partitioning trees or a shared partitioning tree. FIG. 7 illustrates an example of the luma and chroma channels being further partitioned beyond the CU according to separate partitioning trees. FIG. 9 illustrates an example of the luma and chroma channels being further partitioned beyond the CU according to a shared partitioning tree. In one example, a flag may indicate whether the luma and chroma channels are further partitioned according to separate partitioning trees or a shared partitioning tree. Table 7 illustrates an example, where a flag (i.e., separate_tree_flag) indicates whether the luma and chroma channels are further partitioned according to separate partitioning trees (i.e., coding_tree_unit_luma( ) and coding_tree_unit_chroma( )) or a shared partitioning tree (i.e., coding_tree_unit_shared( )), where coding_tree_unit_shared( ) provides semantics that enables various types of partitioning.

TABLE 7

```
coding_unit( )
    FI_part_flag
        if( FI_part_flag == TRUE )
            separate_tree_flag
                if(separate_tree_flag == TRUE )
                    coding_tree_unit_luma( )
                    coding_tree_unit_chroma( )
                else
                    coding_tree_unit_shared( )
```

As described above, in JEM, a QTBT leaf node may be analogous to a TB in ITU-T H.265. Thus, referring to FIG. 7, according to JEM, as described above, QP values would be derived at the CU level. Thus, the techniques described in JEM may be less than ideal. For example, the techniques described in JEM for deriving QP values may not be readily applicable to cases where luma and chroma channels have a common partitioning structure up to a CU level and one or both of the luma and chroma channels are enabled to be further partitioned for purposes of generating predictions.

Figure 10:
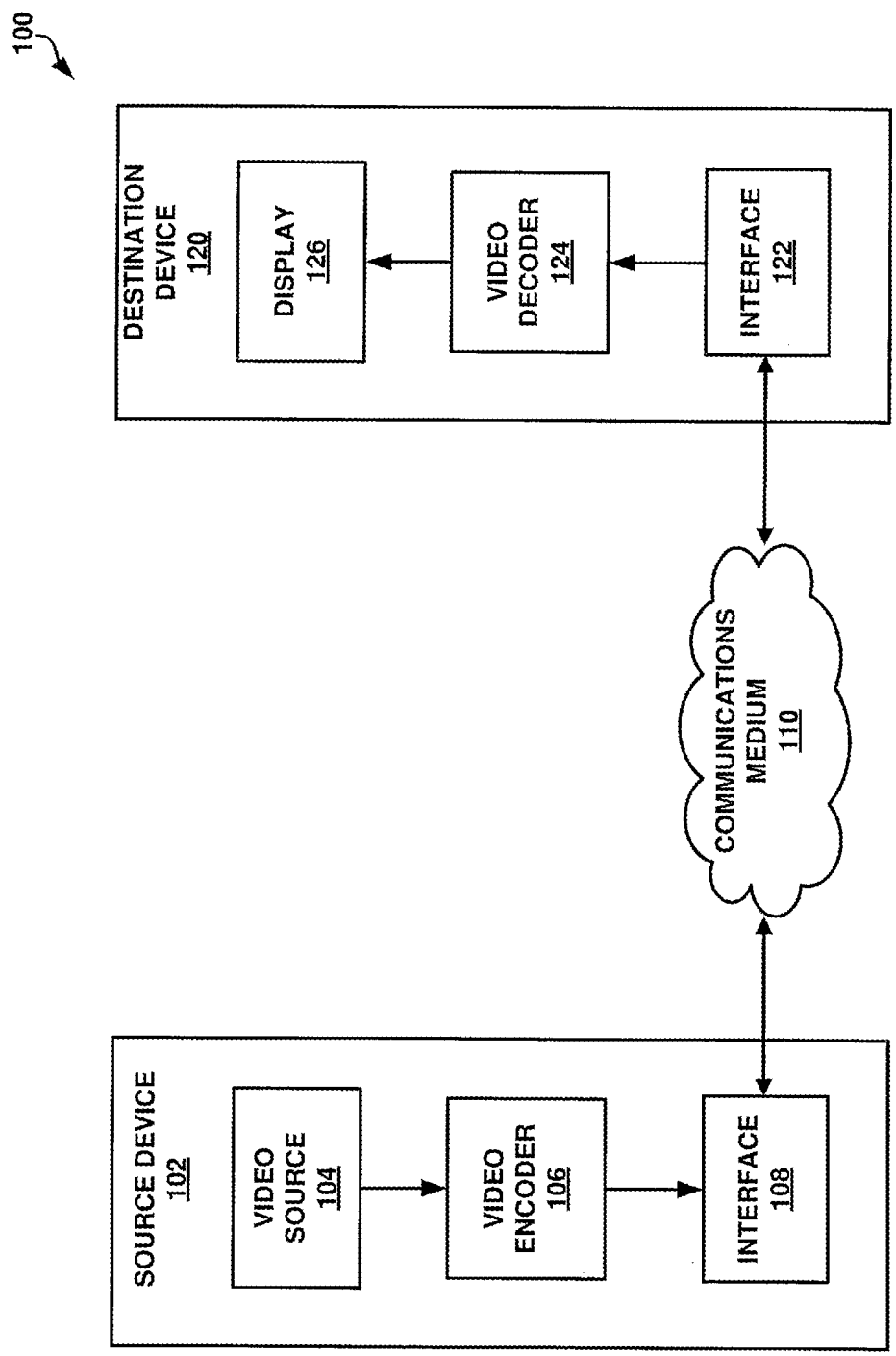
FIG. 10 is a block diagram illustrating an example of a system that may be configured to encode and decode video data according to one or more techniques of this disclosure.

FIG. 10 is a block diagram illustrating an example of a system that may be configured to code (i.e., encode and/or decode) video data according to one or more techniques of this disclosure. System 100 represents an example of a system that may perform video coding using partitioning techniques described according to one or more techniques of this disclosure. As illustrated in FIG. 8, system 100 includes source device 102, communications medium 110, and destination device 120. In the example illustrated in FIG. 10, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include set top boxes, digital video recorders, televisions, desktop, laptop, or tablet computers, gaming consoles, mobile devices, including, for example, "smart" phones, cellular telephones, personal gaming devices, and medical imagining devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Referring again to FIG. 10, source device 102 includes video source 104, video encoder 106, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible) or lossless. Interface 108 may include any device configured to receive a compliant video bitstream and transmit and/or store the compliant video bitstream to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a compliant video bitstream to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, I'C, or any other logical and physical structure that may be used to interconnect peer devices.

Referring again to FIG. 10, destination device 120 includes interface 122, video decoder 124, and display 126. Interface 122 may include any device configured to receive a compliant video bitstream from a communications medium. Interface 108 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, PC, or any other logical and physical structure that may be used to interconnect peer devices. Video decoder 124 may include any device configured to receive a compliant bitstream and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 8, video decoder 124 is described as outputting data to display 126, video decoder 124 may be configured to output video data to various types of devices and/or sub-components thereof. For example, video decoder 124 may be configured to output video data to any communication medium, as described herein.

Figure 11:
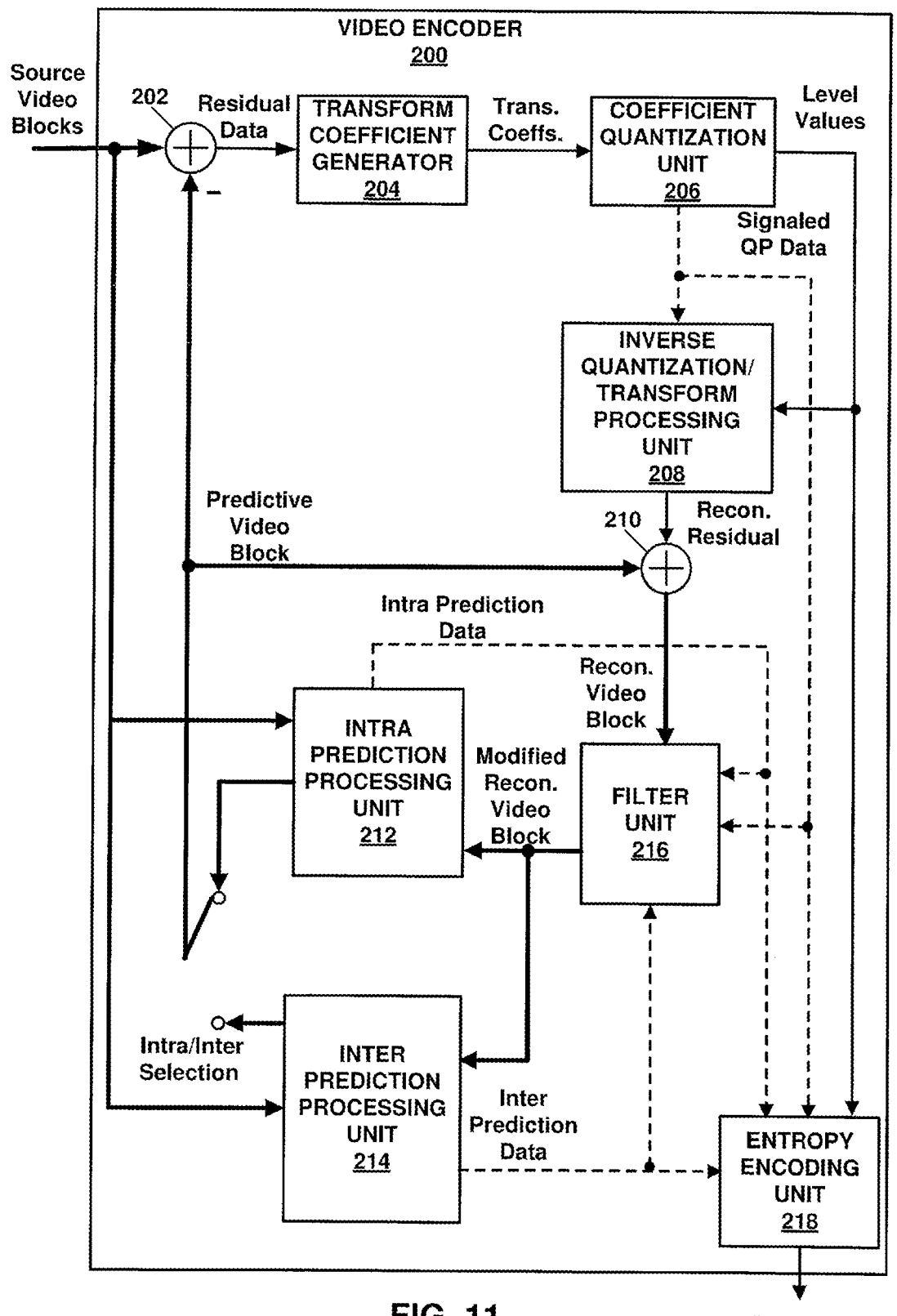
FIG. 11 is a block diagram illustrating an example of a video encoder that may be configured to encode video data according to one or more techniques of this disclosure.

FIG. 11 is a block diagram illustrating an example of video encoder 200 that may implement the techniques for encoding video data described herein. It should be noted that although example video encoder 200 is illustrated as having distinct functional blocks, such an illustration is for descriptive purposes and does not limit video encoder 200 and/or sub-components thereof to a particular hardware or software architecture. Functions of video encoder 200 may be realized using any combination of hardware, firmware, and/or software implementations. In one example, video encoder 200 may be configured to encode video data according to the techniques described herein. Video encoder 200 may perform intra prediction coding and inter prediction coding of picture areas, and, as such, may be referred to as a hybrid video encoder. In the example illustrated in FIG. 11, video encoder 200 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder 200 may be configured to perform additional sub-divisions of source video blocks. It should be noted that some techniques described herein may be generally applicable to video coding, regardless of how source video data is partitioned prior to and/or during encoding. In the example illustrated in FIG. 11, video encoder 200 includes summer 202, transform coefficient generator 204, coefficient quantization unit 206, inverse quantization/transform processing unit 208, summer 210, intra prediction processing unit 212, inter prediction processing unit 214, filter unit 216, and entropy encoding unit 218.

As illustrated in FIG. 11, video encoder 200 receives source video blocks and outputs a bitstream. Video encoder 200 may generate residual data by subtracting a predictive video block from a source video block. Summer 202 represents a component configured to perform this subtraction operation. In one example, the subtraction of video blocks occurs in the pixel domain. Transform coefficient generator 204 applies a transform, such as a discrete cosine transform (DCT), a discrete sine transform (DST), or a conceptually similar transform, to the residual block or sub-divisions thereof (e.g., four 8×8 transforms may be applied to a 16×16 array of residual values) to produce a set of residual transform coefficients. Transform coefficient generator 204 may be configured to perform any and all combinations of the transforms included in the family of discrete trigonometric transforms. As described above, in ITU-T H.265, TBs are restricted to the following sizes 4×4, 8×8, 16×16, and 32×32. In one example, transform coefficient generator 204 may be configured to perform transformations according to arrays having sizes of 4×4, 8×8, 16×16, and 32×32. In one example, transform coefficient generator 204 may be further configured to perform transformations according to arrays having other dimensions. In particular, in some cases, it may be useful to perform transformations on rectangular arrays of difference values. In one example, transform coefficient generator 204 may be configured to perform transformations according to the following sizes of arrays: 2×2, 2×4N, 4M×2, and/or 4M×4N. In one example, a 2-dimensional (2D) M×N inverse transform may be implemented as 1-dimensional (1D) M-point inverse transform followed by a 1D N-point inverse transform. In one example, a 2D inverse transform may be implemented as a 1D N-point vertical transform followed by a 1D N-point horizontal transform. In one example, a 2D inverse transform may be implemented as a 1D N-point horizontal transform followed by a 1D N-point vertical transform. Transform coefficient generator 204 may output transform coefficients to coefficient quantization unit 206.

Coefficient quantization unit 206 may be configured to perform quantization of the transform coefficients. As described above, the degree of quantization may be modified by adjusting a quantization parameter. Coefficient quantization unit 206 may be further configured to determine quantization parameters and output QP data (e.g., data used to determine a quantization group size and/or delta QP values) that may be used by a video decoder to reconstruct a quantization parameter to perform inverse quantization during video decoding. It should be noted that in other examples, one or more additional or alternative parameters may be used to determine a level of quantization (e.g., scaling factors). The techniques described herein may be generally applicable to determining a level of quantization for transform coefficients corresponding to a component of video data based on a level of quantization for transform coefficients corresponding another component of video data.

As described above, the techniques for deriving QP values in JEM may be less than ideal. According to the techniques described herein, coefficient quantization unit 206 may be further configured to determine quantization parameters for video blocks in cases where luma and chroma channels may have a common partitioning structure up to a particular level and one or both of the luma and chroma channels are enabled to be further partitioned (e.g., for purposes of generating predictions) according to separate or a shared partitioning structure. Referring FIG. 7 and FIG. 9, according to the techniques described herein illustrated CBs may be a block of sample values for which the same prediction is applied. Further, illustrated CUs may correspond to a transform quantization group. That is, a residual may be aligned with the illustrated CU for purposes of transformation and/or quantization. Thus, a CU may have a corresponding QP value for each of the luma and chroma channel.

Figure 12:
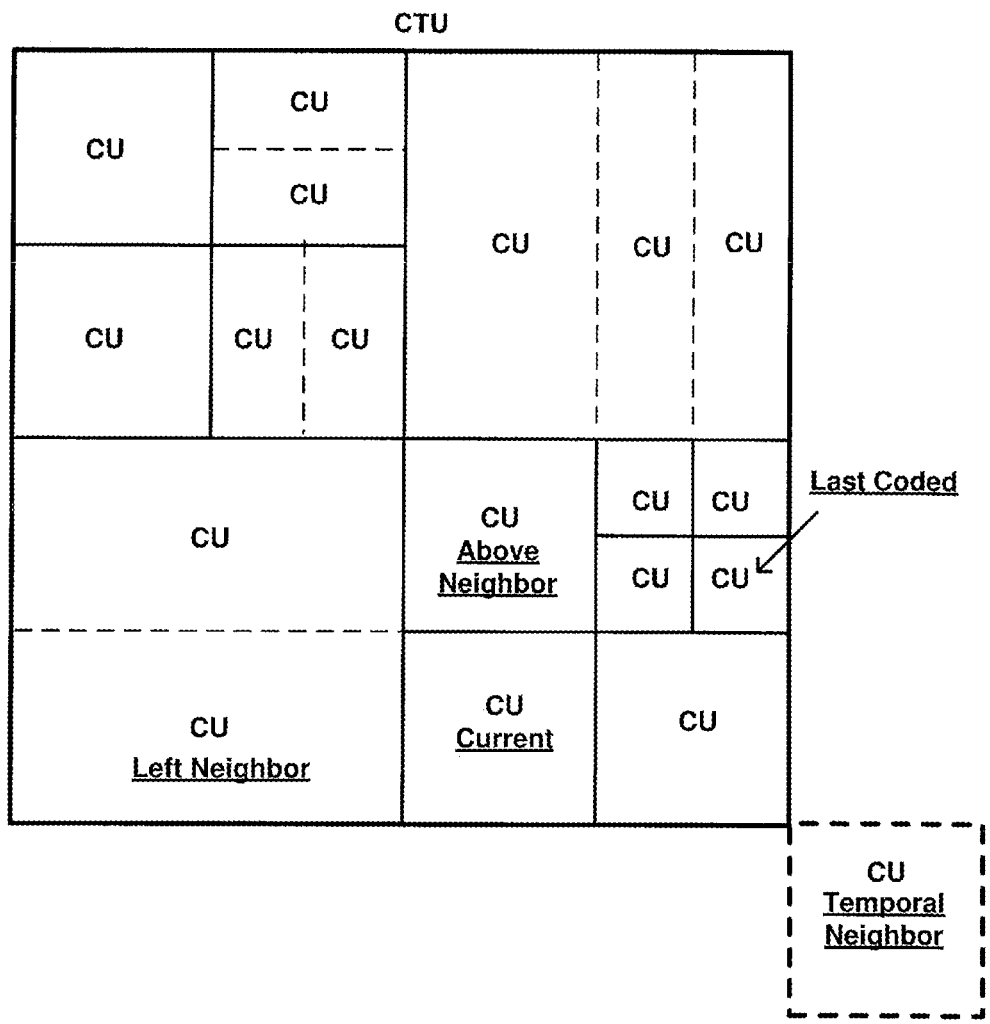
FIG. 12 is a conceptual diagram illustrating video component partitioning and neighboring video blocks according to one or more techniques of this disclosure.

FIG. 12 illustrates an example of a left neighbor CU, an above neighbor CU, a last coded CU, and a temporal neighbor CU for a current CU. FIG. 12 corresponds to the example partitioning described above with respect to Table 5. Thus, neighboring CUs may be defined based on spatial and/or temporal sample locations (included in one or more reference pictures) and a last coded CU may refer to previously coded video block according to video coding semantics (e.g., according to a scan order (e.g., a z-scan)). Further, as described above, each CU may have a corresponding QP value for each of the luma and chroma channels. In one example, the derivation of a QP value for a current video block may include deriving a QP value based on one or more of: a QP value of a neighboring spatial or temporal video block, and/or the last coded QP value. As described in further detail below, a temporal video block may be collocated or determined using a spatial location offset (e.g., a motion vector).

Figure 13:
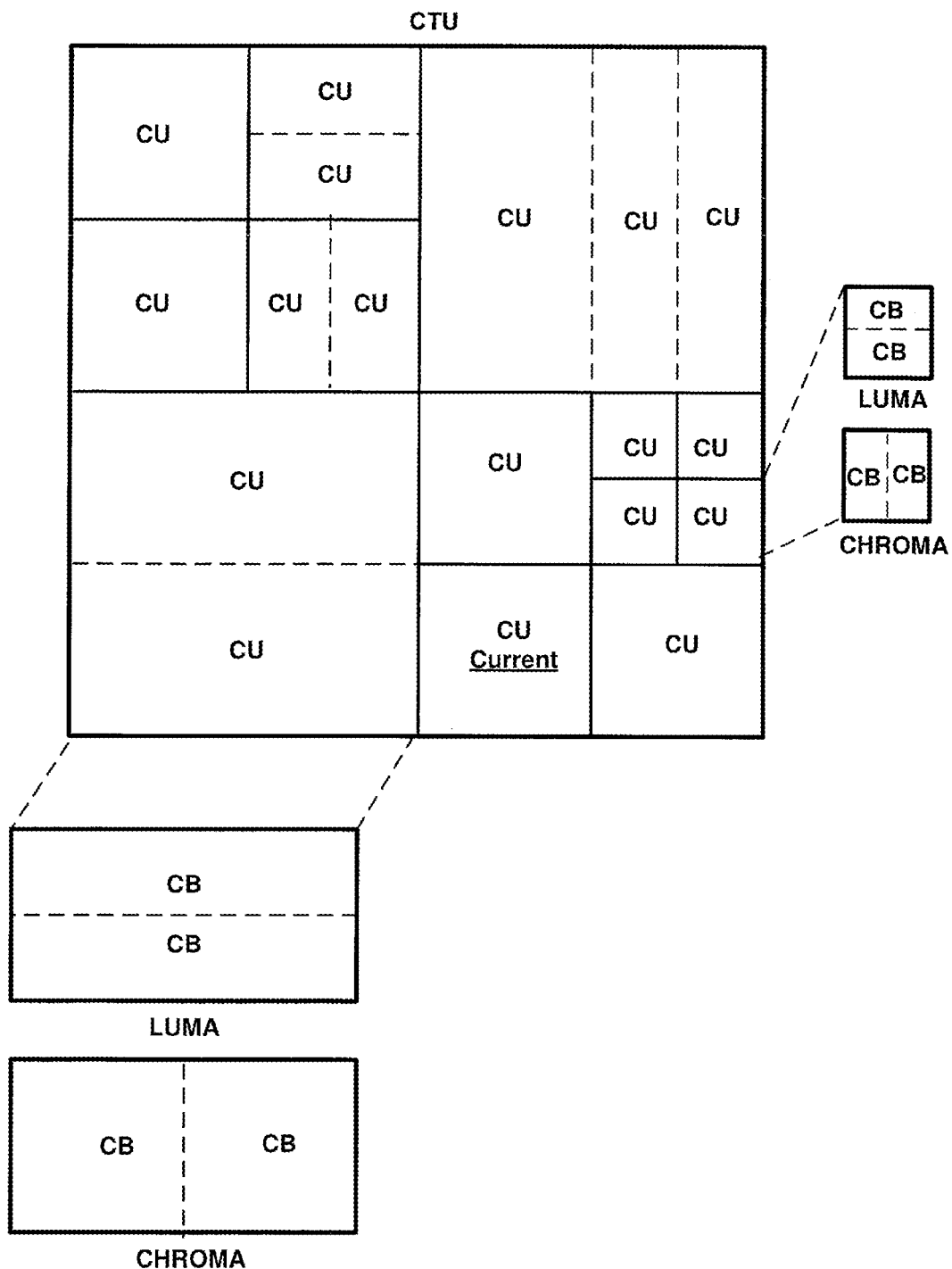
FIG. 13 is a conceptual diagram illustrating video component partitioning and neighboring video blocks according to one or more techniques of this disclosure.

FIG. 13 illustrates an example where a last coded CU and a neighboring CU use separate trees for further partitioning the luma and chroma channels. In one example, according to the techniques herein, when a last coded block uses separate trees for further partitioning the luma and chroma channels, the last coded QP value used for deriving QP values for the current CU, lastCodedQP, may be derived based on the luma QP value of the last coded CU, lastCodedLumaQP, and/or the chroma QP value of the last coded CU, lastCodedChromaQP. For example, lastCodedQP may be derived according to one of the following equations:

lastCodedQP =
    (lastCodedLumaQP + lastCodedChromaQP + 1) >> 1;
lastCodedQP =
    lastCodedLumaQP;
lastCodedQP =
    max(lastCodedLumaQP, lastCodedChromaQP ); or
lastCodedQP =
    min(lastCodedLumaQP, lastCodedChromaQP )

In one example, according to the techniques herein, when a neighboring CU uses separate trees for further partitioning the luma and chroma channels, the neighboring QP value used for deriving QP values for the current CU, neighborQP, may be derived based on the luma QP value of the neighboring CU, neighborLumaQP, and/or the chroma QP value of the neighboring CU, neighborChromaQP. For example, neighhorQP may be derived according to one of the following equations:

neighborQP =
    (neighborLumaQP + neighborChromaQP = 1) >> 1;
neighborQP =
    neighborLumaQP;
neighborQP =
    min(neighborLumaQP, neighborChromaQP); or
neighborQP =
    max(neighborLumaQP, neighborChromaQP)

Figure 14:
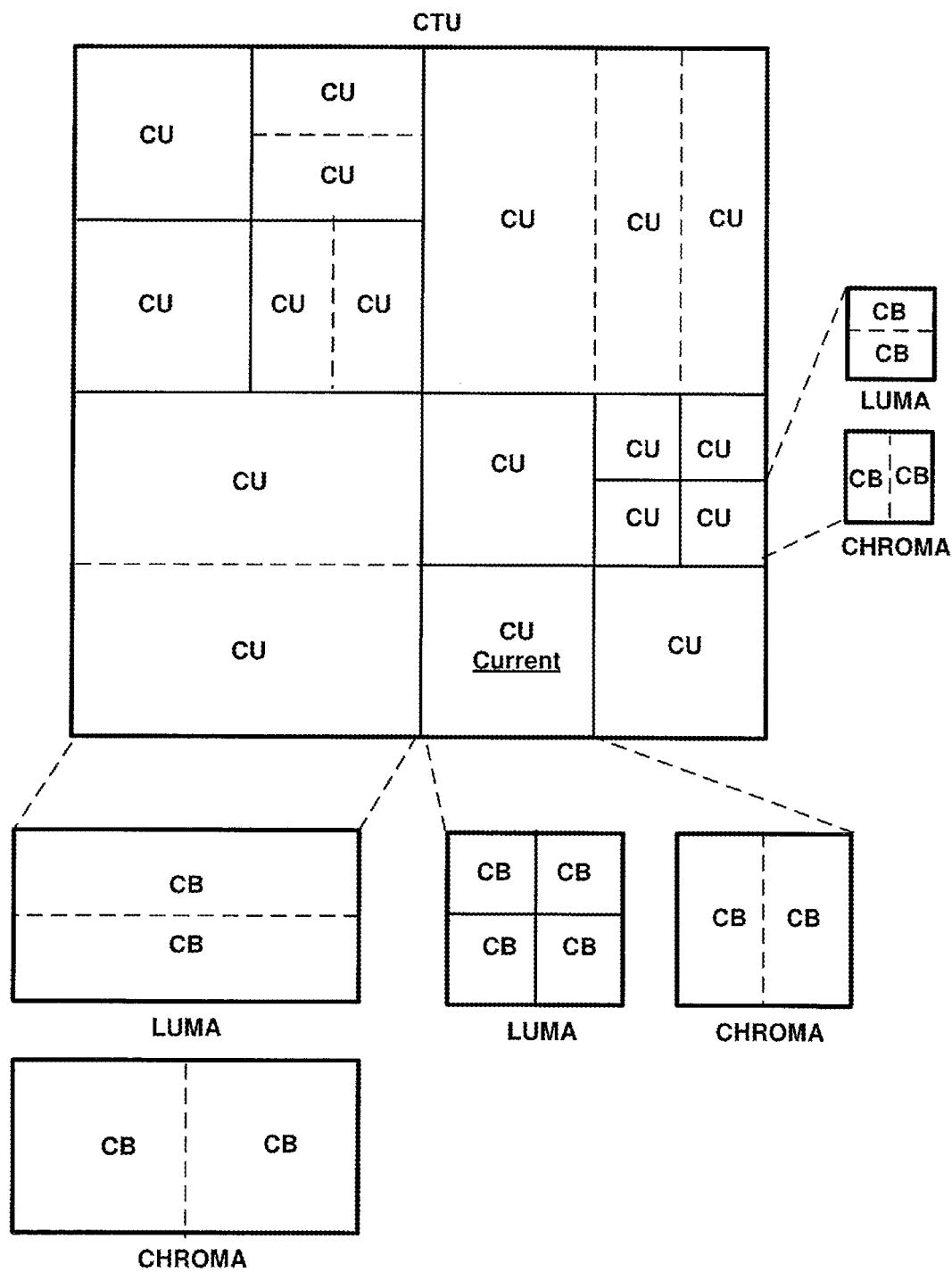
FIG. 14 is a conceptual diagram illustrating video component partitioning and neighboring video blocks according to one or more techniques of this disclosure.

FIG. 14 illustrates an example where a last coded CU, a neighboring CU, and a current CU use separate trees for further partitioning the luma and chroma channels. In one example, according to the techniques herein, when a last coded block and a current CU use separate trees for further partitioning the luma and chroma channels, the last coded QP value used for deriving QP values for the current CU, lastCodedQP for each of the luma and chroma channels of the current block, may be derived based on the luma QP value of the last coded CU, lastCodedLumaQP, and/or the chroma QP value of the last coded CU, lastCodedChmmaQP. For example, lastCodedQP for each of the luma and chroma channels of the current block, may be derived according to one of the following equations:

lastCodedQP for both luma and chroma channels =
    lastCodedLumaQP;
lastCodedQP for luma channel =
    lastCodedLumaQP, and
lastCoded for chroma channel =
    lastCodedChromaQP;
lastCodedQP for both luma and chroma channel =
    (lastCodedLumaQP + lastCodedChromaQP + 1) >> 1;
lastCodedQP for both luma and chroma channels =
    max(LastCodedLumaQP, lastCodedChromaQP ); or
lastCodedQP for both luma and chroma channels =
    min(lastCodedLumaQP, lastCodedChromaQP ).

In one example, according to the techniques herein, when a neighboring video block and a current CU use separate trees for further partitioning the luma and chroma channels, the neighboring QP value used for deriving QP values for the current CU, neighborQP for each of the luma and chroma channels of the current block, may be derived based on the luma QP value of the neighboring CU, neighhorLumaQP, and/or the chroma QP value of the neighboring CU, ncighborChromaQP. For example, neighborQP may be derived according to one of the following equations:

neighborQP for both luma and chroma channels =
    neighborLumaQP;
neighborQP for luma channel =
    neighborLumaQP, and
neighborQP for chroma channel =
    neighborChromaQP;
neighborQP for both luma and chroma channel =
    (neighborLumaQP + neighborChromaQP + 1) >> 1;
neighborQP for both luma and chroma channels =
    max(neighborLumaQP, neighborChromaQP ); or
neighborQP for both luma and chroma channels =
    min(neighborLumaQP, neighborChromaQP ).

Figure 15:
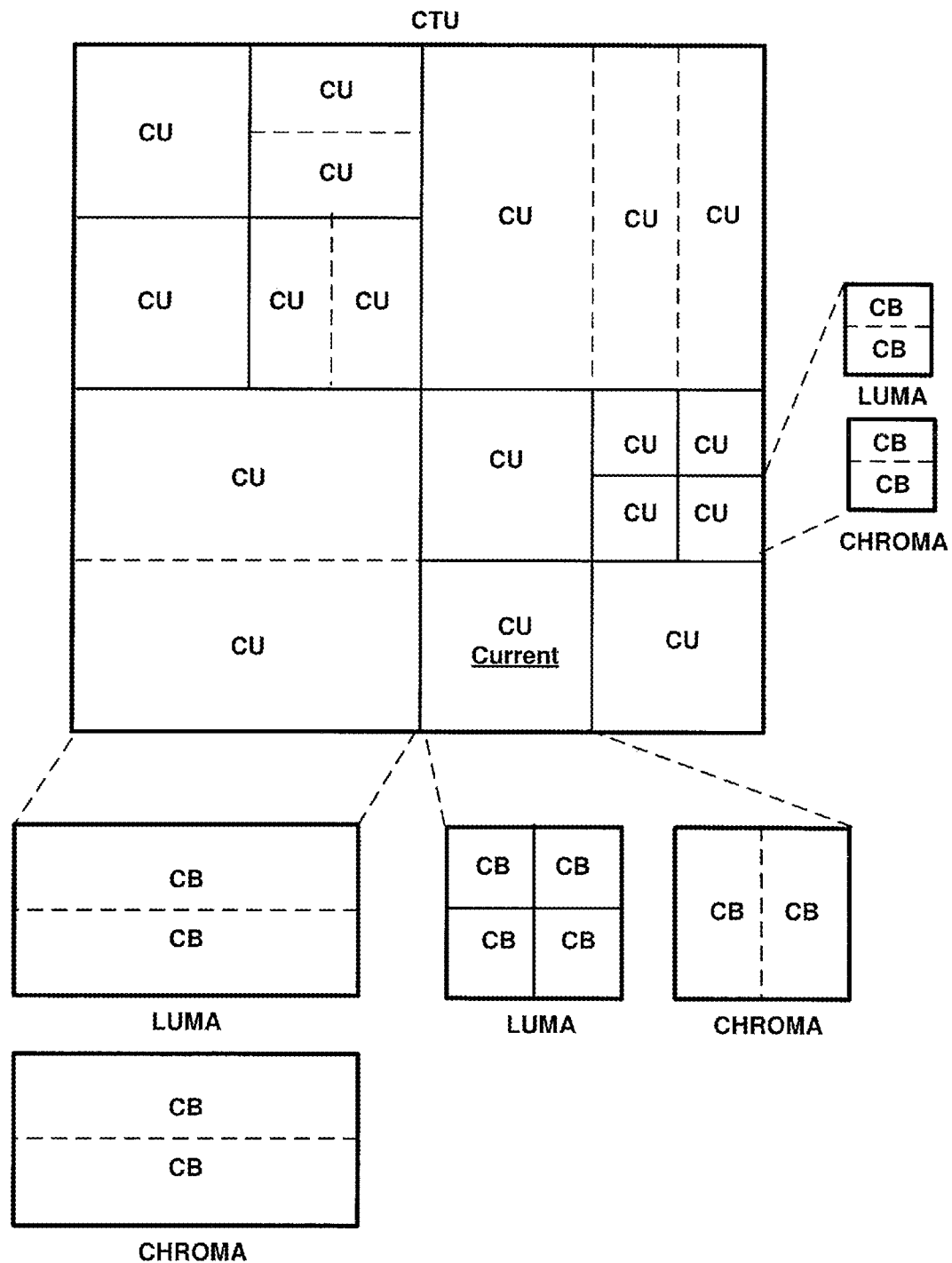
FIG. 15 is a conceptual diagram illustrating video component partitioning and neighboring video blocks according to one or more techniques of this disclosure.

FIG. 15 illustrates an example where a last coded CU and a neighboring CU use a shared partitioning for further partitioning the luma and chroma channels and a current CU uses separate trees for further partitioning the luma and chroma channels. In one example, according to the techniques herein, when a last coded block uses a shared partitioning for further partitioning the luma and chroma channels and a current CU use separate trees for further partitioning the luma and chroma channels, the last coded QP value used for deriving QP values for the current CU, lastCodedQP for each of the luma and chroma channels of the current block, may be derived based on the luma QP value of the last coded CU, lastCodedLumaQP, and/or the chroma QP value of the last coded CU, lastCodedChromaQP. For example, lastCodedQP for each of the luma and chroma channels of the current block, may be derived according to one of the following equations:

---
lastCodedQP for both luma and chroma channels =
   lastCodedLumaQP;
lastCodedQP for luma channel =
   lastCodedLumaQP, and
lastCoded for chroma channel =
   lastCodedChromaQP;
lastCodedQP for both luma and chroma channel =
   (lastCodedLumaQP + lastCodedChromaQP + 1) >> 1;
lastCodedQP for both luma and chroma channels =
   max(lastCodedLumaQP, lastCodedChromaQP ); or
lastCodedQP for both luma and chroma channels =
   min(lastCodedLumaQP, lastCodedChromaQP ).
---

In one example, according to the techniques herein, when a neighboring video block uses a shared partitioning for further partitioning the luma and chroma channels and a current CU uses separate trees for further partitioning the luma and chroma channels, the neighboring QP value used for deriving QP values for the current CU, neighborQP for each of the luma and chroma channels of the current block, may be derived based on the luma QP value of the neighboring CU, neighborLumaQP, and/or the chroma QP value of the neighboring CU, neighborChromaQP. For example, neighborQP may be derived according to one of the following equations:

---
neighborQP for both luma and chroma channels =
   neighborLumaQP;
neighborQP for luma channel =
   neighborLumaQP, and
neighborQP for chroma channel =
   neighborChromaQP;
neighborQP for both luma and chroma channel =
   (neighborLumaQP + neighborChromaQP + 1) >> 1;
neighborQP for both luma and chroma channels =
   max(neighborLumaQP, neighborChromaQP ); or
neighborQP for both luma and chroma channels =
   min(neighborLumaQP, neighborChromaQP ).
---

A QP value for a current CU may be derived based on lastCodedQP or neighborQP according to various techniques described herein. That is, a derived lastCodedQP or neighborQP value may be used as a predictive QP value. For example, in some cases, for the luma channel, lastCodedQP or neighhorQP may be substituted for qPY_PRED in the equations above. That is, the QP value for a current CU may be derived by adding a delta value to lastCodedQP or neighhorQP. Further, in some examples, a chroma QP for a current CU may be derived based upon the luma QP of the current CU. For example, a chroma QP value may be derived using a one or more chroma QP offset in a manner similar to that described above. The one or more chroma offsets may be signaled at various locations, (e.g., parameter sets (e.g., PPS), slice headers, etc.), it should be noted that, in some cases (e.g., high dynamic range video), the properties of corresponding luma sample values such as: a DC value of corresponding decoded luma sample values, a variance value of corresponding decoded luma sample values, DC values of a prediction used for corresponding luma sample values, a variance value of a prediction used for corresponding luma sample values; may be used to determine a QP prediction for a chroma block. Further, in some examples, a chroma QP for a current CU may be derived independently of a luma QP. That is, for example, respective predictive QP values may be derived for each of the luma channel and the chroma channel.

It should be noted that in some cases, in the example where a last coded CU and a neighboring CU use a shared partitioning for further partitioning the luma and chroma channels and a current CU uses separate trees for further partitioning the luma and chroma channels, it may be useful to derive a predictive QP without using lastCodedQP or neighborQP. That is, some cases, lastCodedQP or neighborQP may not serve as good predictors in this case. That is, a signaled delta QP value may be relatively large. In one example, according to the techniques described herein, in the case where a last coded CU and a neighboring CU use a shared partitioning for further partitioning the luma and chroma channels and a current CU uses separate trees for further partitioning the luma and chroma channels, coefficient quantization unit 206 may be configured to calculate a predictive QP value for the luma channel and/or the chroma channel based on a variance based technique.

In one example, according to the techniques herein, a predictive QP may be derived according to the following process:

$$qP\_PRED_0 = qP\_L + qP\_A - qP\_AL;$$

$$qP\_PRED_1 = \max(qP\_PRED_0, \min(qP\_L, qP\_A));$$

$$qP\_PRED_F = \min(qP\_PRED_1, \max(qP\_L, qP\_A)).$$

Where, qP_L in most cases, (e.g., depending on availability) is set equal to the QP value of the coding unit at the position to the left of the current CU;

qP_A in most cases, is set equal to the QP value of the coding unit at the position above the current CU; and qP_AL in most cases, is set equal to the QP value of the coding unit at the position above-left of the current CU; and It should be noted that deriving predictive QP according to the process above, typically yields smaller values of delta QP on average and increases the likelihood of delta QP being zero and further compresses the signaling of QP data.

In one example, according to the techniques herein, a QP value for a CU may be calculated as follows:

$$QP = QP\_Rate + dQP\_Visual;$$

$$QP\_Rate = lastCodedQP_{Rate} + \text{delta}\_QP_{Rate};$$

$$dQP\_Visual = dQP\_Visual_{PRED} + \text{delta}\_dQP_{Visual};$$

Where lastCodedQP$_{Rate}$ is the QP_Rate value of the previously coded CU; when there is no previously coded CU, e.g., at the beginning of a slice, lastCodedQP$_{Rate}$ takes the value sliceQP signaled in the slice header;

delta_QP$_{Rate}$ is the difference between the QP_Rate of the current CU and lastCodedQP$_{Rate}$;

dQP_Visual$_{PRED}$ is a predictive dQP_Visual value, which is calculated using the qP_PRED$_0$, qP_PRED$_1$, and qP_PRED$_F$, with qP_L, qP_A, and qP_AL set to the dQP_Visual values of the corresponding neighboring CU; and delta_dQP$_{Visual}$ is the difference between the dQP_Visual of the current CU and dQP_Visual$_{PRED}$.

In this manner, the QP value of a current CU may be indicated by signaling a difference value between a current rate component QP value and a predictor rate component QP value, where the predictor rate component QP value is based on the rate component QP value of a previously coded CU; and signaling a difference value between a current visual component QP value and a predictor visual component QP value, where the visual component QP value is based on the visual component QP value of one or more neighboring CUs.

It should be noted that in some examples, dQP_Visual$_{PRED}$ may be determined based on the following equation:

$$dQP\_Visual_{PRED} = dQP_{SV};$$

where, dQP$_{SV}$ may be determined based an average luma value for a reference block of video data and a corresponding function (including one or more look-up tables);

For example, an average luma value for a reference block of video data may be indexed to a dQP$_{SV}$ value. For a current block of video data, a reference block of video may include, for example, (i) one or more collocated blocks, (ii) a block forming a motion compensated prediction and/or (iii) one or more spatial neighboring blocks.

In one example, whether a QP value for a current CU is determined according QP_Rate and/or dQP_Visual may be determined according to a set of flags included in a parameter set or a slice header. That is, QP_Rate and dQP_Visual may be switched ON/OFF independently and may be coded at different spatial granularities, as determined by an index included in a parameter set. It should be noted that when one of QP_Rate or dQP_Visual is "OFF," a corresponding delta QP value is assumed to be 0. Therefore, if QP_Rate is switched off, then the value of QP_Rate is inferred to be equal to sliceQP for every CU in the slice. If dQP_Visual is switched off, the value of dQP_Visual is inferred to be equal to 0 for every CU in the slice. In some instances, it may be useful to use coarse spatial granularity for QP_Rate and fine spatial granularity for dQP_Visual.

Ribas-Corbera. J. et al., Rate Control for Low-Delay Video Communications, Contribution Q15-A-20 to ITU-T Video Coding Experts Group First Meeting (ITU-T SG16 Q.15 Study Period 1997-2000), Portland, Oreg., USA, June 1997, which is incorporated by reference herein, and referred to as Ribas-Corbera, describes a rate control technique that adapts the QP for macroblocks within a frame according to optimized hit allocation strategy. A variance based technique for deriving a predictive QP technique may be based on Ribas-Corbera, as describe below. It should be noted that as described above, ITU-T H.265 specifics a CTU structure, which is analogous to the 16×16 macroblock in predecessor video coding standards. It should be noted that in some cases, a macroblock may correspond to a quantization group. Thus, as described in further detail below, the techniques described in Rihas-Corbera may be applied to CUs having a size other than 16×16. Ribas-Corbera describes where Q, the quantization step size for the i-th macroblock, is computed based on the optimized quantization step size, Q$_i$*. It should be noted that Rihas-Corbera is based on a video coding standard where QP=2*Q$_i$. In ITU-T H.265, Q$_i$=2$^{rQP\ 4th}$ for most profiles. In particular. Rihas-Corbera describes where for a picture having N macroblocks and B being the total number of hits allocated for encoding the picture, Q$_i$ is computed based on the optimized quantization step size, Q$_i$*, which is specified as follows:

$$Q_i^* = \sqrt{\frac{AK_{i-1}\sigma_i}{(B-ANC_1)}\sum_{k-1}^{v}\sigma_k}$$

where,

A is the number of samples in a macroblock;

B is the total number of bits B allocated for encoding the picture;

N is the number of macroblocks in the picture;

σ$_t$ is the empirical standard deviation of the difference between the prediction and original luma and chroma samples in the i-th macroblock; and $$K_{i-1} = \frac{B'_{LC,i-1}(Q_{i-1})^2}{A\sigma_{i-1}^2}, \text{ and } C_{i-1} = \frac{B'_{i-1} - B'_{LC,i-1}}{A},$$

where B$_{LC,i}$' is the number of bits used to encode the luma and chroma of the i-th macroblock and B'$_i$ is the actual number of bits used to encode the DCT coefficients of the i-th macroblock.

From the optimized quantization parameter in Ribas-Corbera, a relationship between variance and quantization step size may be derived as follows:

Let $$B'_{LC,i} = \frac{B}{N}$$

and B$_i$'=B$_{LC,i}$'−b$_i$' where b$_i$' is the number of bits in the i-th marcoblock that are not associated with the DCT coefficients (e.g., bits used to code prediction modes, etc.).

Further, let $$b'_i = \frac{b}{N}$$

where b is the number of bits in the picture not associated with the DCT coefficients.

Substituting these expressions into those for K$_{i-1}$ and C$_{i-1}$ yields:

$$K_{i-1} = \frac{\frac{B}{N}(Q_{i-1})^2}{A\sigma_{i-1}^2} \text{ and } C_{i-1} = C = \frac{-b}{AN}.$$

Further substituting the above expressions for K$_{i-1}$ and C$_{i-1}$ into the expression for Q$_i$* and simplifying yields:

$$Q_i^* = Q_{i-1}\sqrt{\frac{\sigma_i \frac{1}{N}\sum_{k=1}^{N}\sigma_k}{\sigma_{i-1}^2} \times \frac{1}{1+\frac{b}{B}}}$$

For ITU-T H.265 an expression for quantization step size, Q$_i$, may be derived as:

$$Q_i = 2^{(qP_{Y\_PRED}-4)/6} = 2^{(QP_{i-1}-4)/6} \sqrt{\frac{\sigma_i \frac{1}{N}\sum_{k=1}^{N}\sigma_k}{\sigma_{i-1}^2} \times \frac{1}{1+\frac{b}{B}}}$$

Solving for qPY_PRED in the equation above yields:

$$qP_{Y_{PRED}} = QP_{i-1} + 3\log_2\left[\frac{\sigma_i \frac{1}{N}\sum_{k=1}^{N}\sigma_k}{\sigma_{i-1}^2} \times \frac{1}{1+\frac{b}{B}}\right]$$

Further, in the equation above, $QP_{i-1}$ may be replaced with $qP_{Y\_A}$, described above, thus, according to the techniques described herein, video encoder 200 may be configured to determine $qP_{Y\_PRED}$ based on the following equation:

$$qP_{Y_{PRED}} = qP_{Y\_A} + 3\log_2\left[\frac{\sigma_i \frac{1}{N}\sum_{k=1}^{N}\sigma_k}{\sigma_{i-1}^2} \times \frac{1}{1+\frac{b}{B}}\right]$$

It should be noted that in the equation above,
The term $$\frac{1}{1+\frac{b}{B}}$$

accounts for the fact that QP affects only the bit rate of the DCT coefficients (or similarly, QP affects the bit rate of the result of a transformation process, e.g., 2-D DST, other 2-D transforms, 1-D transforms, a primary and secondary transform, or no transform (affects residual)) and can be estimated using previously coded frames and/or set to a constant.

The value of $\sigma_{i-1}^2$ can be estimated by the decoder by computing the variance of the decoded luma and chroma coefficient values of the previous CU.

The value of $$\frac{1}{N}\sum_{k=1}^{i-1}\sigma_k$$

can estimated as the average of the standard deviation of the luma and chroma coefficient values of previously decoded CUs in the picture.

The value of $\sigma_i$ can be estimated using the empirical standard deviation of estimates for the decoded luma and chrome coefficient values in the i-th CU. It should be noted that it is necessary to know the QP value associated with the i-th CU in order to decode its turns and chroma coefficients. Because the QP value of the i-th CU is not known a priori, an estimate of its value may be used instead. In one example, the QP associated with the i-th CU may be estimated as the arithmetic average of the QP's associated with all CU's in the picture that have been decoded prior to the i-th CU. The QP for the first CU in the picture may be estimated as the picture QP value.

Thus, according to the techniques described herein, video encoder 200 may be configured to determine $qP_{Y\_PRED}$ based on the following equation:

$$qP_{Y_{PRED}} = qP_{Y\_A} + 3\log_2\left[\frac{\sigma_i^* \times SD_{avg\_p}}{Var_{i-1}} \times C\right]$$

where,
$\sigma_i^*$ is the estimated empirical standard deviation of the difference between the prediction and original luma and chroma values in the current CU;
$SD_{avg\_P}$ is the average of the standard deviation of the luma and chroma coefficient values of previously decoded CUs in the picture;
$Var_{i-1}$ the variance of the decoded luma and chroma coefficient values of the previous CU; and
C is a predetermined constant.

In this manner, coefficient quantization unit 206 is configured to determine $qP_{Y\_PRED}$ of a current CU by adjusting the QP value of a previously coded CU based on whether the product of $\sigma_i^*$ times $SD_{avg\_P}$ is greater than $Var_{i-1}$ in which case $qP_{Y\_PRED}$ of a current CU is adjusted to be greater than the QP of the previously coded CU.

It should be noted that with respect to the term $$3\log_2\left[\frac{\sigma_i^* \times SD_{avg\_p}}{Var_{i-1}} \times C\right]$$

in the equation above, the scaling factor of 3 results from a theoretical derivation. In some examples, it may be advantageous to use a different constant that may be derived empirically. That is, in some examples a scaling factor other than 3 may be used.

It should be noted that with respect to C, the value of b/B is constrained based on the video coding standard. That is, a video coding standard has a theoretical minimum and a maximum value of b/B. Further, the value of the QP affects the value of b/B, as for high QP values, fewer hits are used to encode the DCT coefficients thereby increasing b/B. A theoretical maximum value of b/B would be 1, since it is possible for the QP to be high enough such that all coefficient levels equal zero (i.e., zero hits are used to encode the coefficient values). A theoretical minimum value of b/B would be dependent on a video coding standard. A typical value of b/B would be dependent on a target hit rate. In a typical case for high quality video, for example, b/B would be ap-proximately 0.3, and C would be equal to 0.77. For purposes of description on the techniques described herein, in an encoded picture, b/B may be described as typically being in the range of 0.25 to 0.75, and thus, C would typically be within the range of 0.5714 to 0.8.

It should be noted that in the equation above, a term $((\sigma_i^* SD_{avg\_P})/Var_{i-1})$ indicates the relative prediction accuracy of the current CU, since accurate prediction leads to low residual variance and inaccurate prediction leads to high residual variance. That is, $Var_{i-1}$ is an indication of the prediction accuracy of the previous CU and if $\sigma_i$ is relatively large, which indicates that the prediction accuracy of the current CU is relatively poor, $(\sigma_i^* SD_{avg\_P})$ is likely to be greater than $Var_{i-1}$. When $(\sigma_i^* SD_{avg\_P})$ is greater than $Var_{i-1}$, $$\log_2\left[\frac{\sigma_i^* \times SD_{avg\_p}}{Var_{i-1}} \times C\right]$$

is typically positive and qPY$_{PRED}$ is increased compared to qP$_{Y\_A}$. Likewise, when ($\sigma_i^*$SD$_{avg\_p}$) is less than Var$_{i-1}$, $$\log_2\left[\frac{\sigma_i^* \times SD_{avg\_p}}{Var_{i-1}} \times C\right]$$

is typically less than zero and qPY$_{PRED}$ is decreased compared to qP$_{Y\_A}$. It should be noted that well predicted regions of a picture may correspond to visually important areas of a picture (e.g., a face) and poorly predicted regions of a picture may correspond to visually unimportant areas of a picture (e.g., high texture regions, such as leaves of a tree). In this manner, coefficient quantization unit 206 is configured to determine qP$_{Y\_PRED}$ of a current CU by adjusting the QP value of a previously coded CU based on the relative prediction quality of the current CU, where quantization is increased if the CU is relatively poorly predicted and decreased if the CU is relatively highly predicted.

Figure 16:
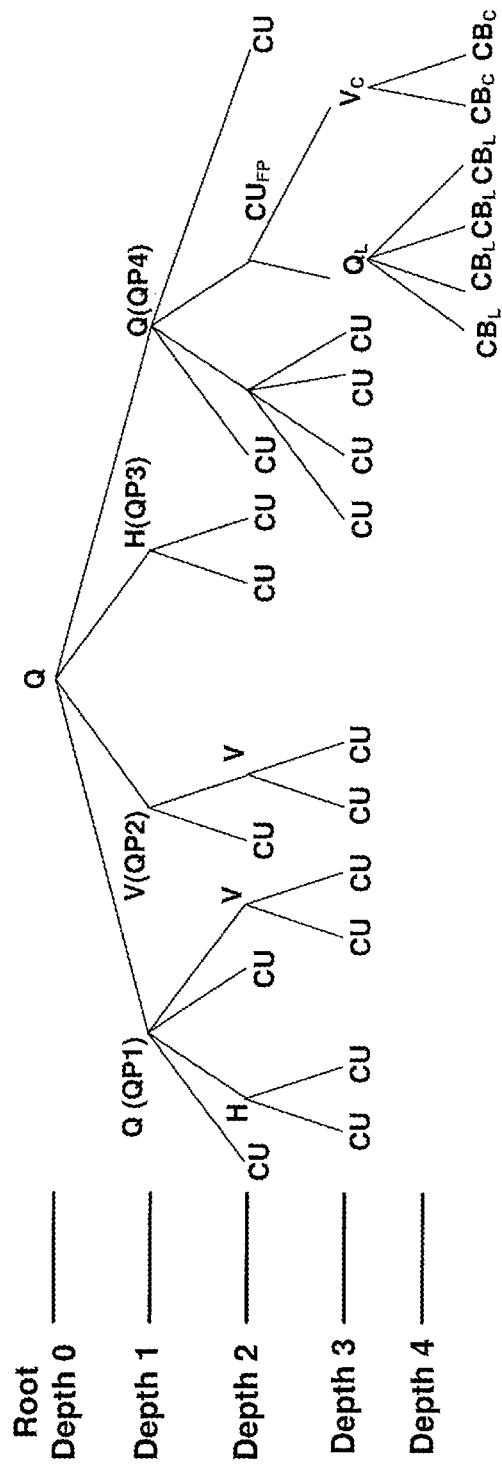
FIG. 16 is a conceptual diagram illustrating an example of a quad tree binary tree in accordance with one or more techniques of this disclosure.

As described above, in JEM, residual values corresponding to a CB are used to generate transform coefficients without further partitioning, i.e., in JEM a QTBT leaf node may be analogous to a TU in ITU-T H.265, and thus, QP values in JEM are derived at the CU level. According to the techniques described herein, QP values may be derived at depths other than at the CU level. Referring to the example illustrated in FIG. 7, in one example according to the techniques described herein, a QP value may be derived for and signaled at a specified depth. FIG. 16 illustrates an example QTBT where a QP value is derived for each depth 1 node. That is, QP1, QP2, QP3, and QP4 are derived for each depth 1 node and the leaf nodes that are at a depth beyond the depth 1 nodes form a transform coefficient group. Table 8 illustrates an example of pseudo-syntax that may be used to signal the shared QTBT and the independent QTBTs for the luma and chroma channels and further signal QP values at depth 1 nodes for the example illustrated FIG. 16. It should be noted that tree in FIG. 16 and the pseudo-syntax in Table 8 are derived according to a z-scan.

TABLE 8

```
QT flag = 1, //Depth 0 syntax
   QT flag = 1; QP1_signaling( ) //Depth 1 syntax
      QT flag = 0, BT split = 0; //Depth 2 syntax
         FI_Part = FALSE // FI_Part Condition
      QT flag = 0, BT split = 2; //Depth 2 syntax
         BT split = 0; //Depth 3 syntax
            FI_Part = FALSE // FI_Part Condition
         BT split = 0; //Depth 3 syntax
            FI_Part = FALSE // FI_Part Condition
      QT flag = 0, BT split = 0; //Depth 2 syntax
         FI_Part = FALSE // FI_Part Condition
      QT flag = 0, BT split = 1; //Depth 2 syntax
         BT split = 0; //Depth 3 syntax
            FI_Part = FALSE // FI_Part Condition
         BT split = 0; //Depth 3 syntax
            FI_Part = FALSE // FI_Part Condition
   QT flag = 0; BT split 1; QP2_signaling( ) //Depth 1 syntax
      BT split = 0; //Depth 2 syntax
         FI_Part = FALSE // FI_Part Condition
      BT split = 1; //Depth 2 syntax
         BT split = 0, //Depth 3 syntax
            FI_Part = FALSE// FI_Part Condition
         BT split = 0; //Depth 3 syntax
            FI_Part = FALSE// FI_Part Condition
   QT flag = 0; BT split 2; QP3_signaling( ) //Depth 1 syntax
      BT split = 0; //Depth 2 syntax
         FI_Part = FALSE // FI_Part Condition
      BT split = 0; //Depth 2 syntax
         FI_Part = FALSE // FI_Part Condition
```

TABLE 8-continued

```
   QT flag = 1; QP4_signaling( ) //Depth 1 syntax
      QT flag = 0, BT split = 0; //Depth 2 syntax
         FI_Part = FALSE // FI_Part Condition
      QT flag = 1; //Depth 2 syntax
         QT flag = 0, BT split = 0; //Depth 3 syntax
            FI_Part = FALSE // FI_Part Condition
         QT flag = 0, BT split = 0; //Depth 3 syntax
            FI_Part = FALSE // FI_Part Condition
         QT flag = 0, BT split = 0; //Depth 3 syntax
            FI_Part = FALSE II FI_Part Condition
         QT flag = 0, BT split = 0; //Depth 3 syntax
            FI_Part = FALSE // FI_Part Condition
      QT flag = 0, BT split = 0; //Depth 2 syntax
         FI_Part = TRUE // FI_Part Condition
         QT Luma flag = 1;
            QT Luma flag = 0; BT Luma split = 0;
            QT Luma flag = 0; BT Luma split = 0;
            QT Luma flag = 0; BT Luma split = 0;
            QT Luma flag = 0; BT Luma split = 0;
         QT Chroma flag = 0, BT Chroma split = 1;
            BT Chroma split 0;
            BT Chroma split = 0.
      QT flag = 0, BT split = 0; //Depth 2 syntax
         FI_Part = FALSE // FI_Part Condition
```

As described above, a QP value may be derived for and signaled at a specified depth. In one example, if the quantization groups are defined with at depth 3 nodes, then transform units (or CUs or leaves of transform partitioning tree) that are above this depth may also signal a QP value. Thus, in general, any leaf or node in tree that has a depth less than or equal to the highest depth value for which a QP value can be signaled may include a signaled QP value. Further, all leaves/nodes below the highest depth value for which a QP value can be signaled may inherit a QP value from their parents/ancestors nodes.

As described above, according to the techniques described herein, the luma and chroma channels may be further partitioned beyond the CU for purposes of prediction according to separate partitioning trees or a shared partitioning tree. In one example, when the luma and chroma channels are further partitioned beyond the CU for according to a shared partitioning tree, the QP value for the luma and chroma channel may be derived based on a signaled QP value at a parent depth and when the luma and chroma channels are further partitioned beyond the CU for according to separate partitioning tree, a QP value may be derived (i.e., signaled by a video encoder and received by a video decoder) for each of the luma and chroma channels based on a QP value(s) signaled at the root of the separate trees. In some cases, a common QP value may be derived for the luma and chroma channels. Table 9 illustrates an example of pseudo-syntax that may be used to signal a QP value for each of the luma and chroma channels having separate partitioning trees.

TABLE 9

```
coding_unit( )
   FI_part_flag
      if( FI_part_flag == TRUE )
         separate_tree_flag
            if(separate_tree_flag == TRUE )
               coding_tree_unit_luma( )
               QP_luma_signaling( )
               coding_tree_unit_chroma( )
               QP_chroma_signaling( )
            else
               coding_tree_unit_shared( ) // QP derived from parent or
               common QP
```

Figure 17:
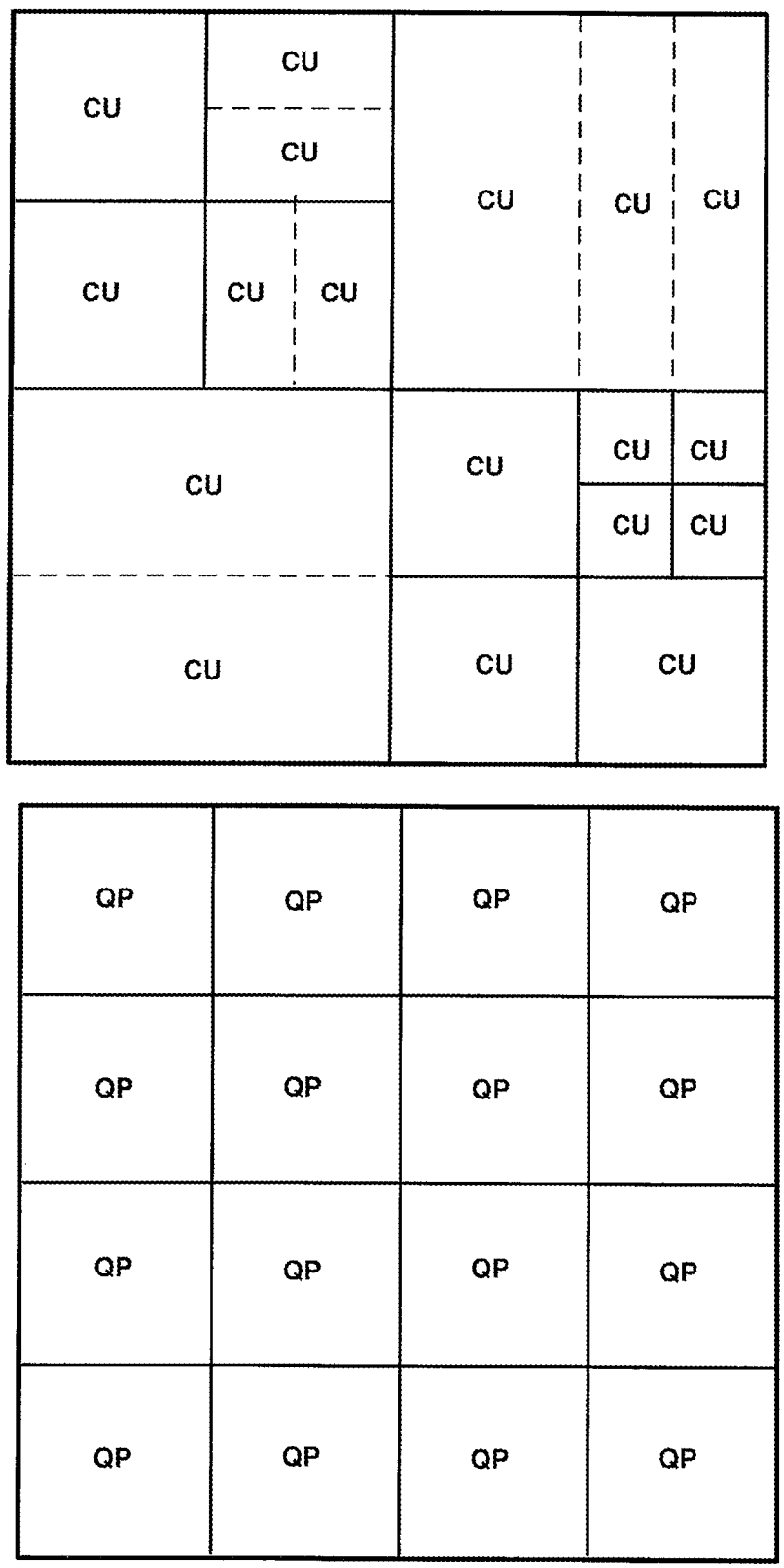
FIG. 17 is a conceptual diagram illustrating video component partitioning and quantization groups according to one or more techniques of this disclosure.

In one example, according to the techniques described herein, transform quantization groups may be derived independent partitioning used for purposes of prediction. That is, for example, transform quantization groups may be set based on predetermined/signaled block sizes and a QP value may be signaled for each block independent of partitioning. It should be noted that in some cases. QP blocks at the picture boundary may have a different size (e.g., partial QP blocks may be formed at a boundary). FIG. 17 illustrates an example of a QP value being signal for each block independent of an example partitioning. That is, in FIG. 17, a QP value is derived for a CU based on the collocated QP value. It should be noted that, in some cases, as illustrated in FIG. 17 with respect to the bottom left rectangular CU, a CU may include multiple collocated QP values. In this manner, a set of rules may be defined to derive a QP value for such a CUs. For example, a collocated QP value may be defined as the QP value collocated with the top-left sample of a CU. That is, in this example, a spatial location of sample(s) in the block is used to determine the QP to be used for the block. In one example, in the cases where luma and chroma channels are further partitioned according to separate trees, luma and chroma channels may be considered as one quantization group and luma and chroma channels may be assigned the same collocated QP. In one example, in the cases where luma and chroma channels are further partitioned according to separate trees, QP signaling may depends on both chroma and cbfChroma, and isCuQpDeltaCoded is only set once at a luma and chroma quantization group, for example, as illustrated in Table 2.

Referring again to FIG. 11, quantized transform coefficients are output to inverse quantization/transform processing unit 208. Inverse quantization/transform processing unit 208 may be configured to apply an inverse quantization and an inverse transformation to generate reconstructed residual data. As illustrated in FIG. 11, at summer 210, reconstructed residual data may be added to a predictive video block. In this manner, an encoded video block may be reconstructed and the resulting reconstructed video block may be used to evaluate the encoding quality for a given prediction, transformation, and/or quantization. Video encoder 200 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

As described above, a video block may be coded using an intra prediction. Intra prediction processing unit 212 may be configured to select an intra prediction mode for a video block to be coded. Intra prediction processing unit 212 may be configured to evaluate a frame and/or an area thereof and determine an intra prediction mode to use to encode a current block. As illustrated in FIG. 11, intra prediction processing unit 212 outputs intra prediction data (e.g., syntax elements) to entropy encoding unit 218 and transform coefficient generator 204. As described above, a transform performed on residual data may be mode dependent. As described above, possible intra prediction modes may include planar prediction modes, DC prediction modes, and angular prediction modes. Further, in some examples, a prediction for a chroma component may be inferred from an intra prediction for a luma prediction mode. Inter prediction processing unit 214 may be configured to perform inter prediction coding for a current video block. Inter prediction processing unit 214 may be configured to receive source video blocks and calculate a motion vector for PUs of a video block. A motion vector may indicate the displacement of a PU (or similar coding structure) of a video block within a current video frame relative to a predictive block within a reference frame. Inter prediction coding may use one or more reference pictures. Further, motion prediction may be uni-predictive (use one motion vector) or bi-predictive (use two motion vectors). Inter prediction processing unit 214 may be configured to select a predictive block by calculating a pixel difference determined by, for example, sum of absolute difference (SAD), sum of square difference (SSD), or other difference metrics. As described above, a motion vector may be determined and specified according to motion vector prediction. Inter prediction processing unit 214 may be configured to perform motion vector prediction, as described above. Inter prediction processing unit 214 may be configured to generate a predictive block using the motion prediction data. For example, inter prediction processing unit 214 may locate a predictive video block within a frame buffer (not shown in FIG. 11). It should be noted that inter prediction processing unit 214 may further be configured to apply one or more interpolation filters to a reconstructed residual block to calculate sub-integer pixel values for use in motion estimation. Inter prediction processing unit 214 may output motion prediction data for a calculated motion vector to entropy encoding unit 218. As illustrated in FIG. 11, inter prediction processing unit 214 may receive reconstructed video block via filter unit 216. Filter unit 216 may be configured to perform deblocking and/or Sample Adaptive Offset (SAO) filtering. Deblocking refers to the process of smoothing the boundaries of reconstructed video blocks (e.g., make boundaries less perceptible to a viewer). SAO filtering is a non-linear amplitude mapping that may be used to improve reconstruction by adding an offset to reconstructed video data.

Referring again to FIG. 11, entropy encoding unit 218 receives quantized transform coefficients and predictive syntax data (i.e., intra prediction data, motion prediction data, QP data, etc.). It should be noted that in some examples, coefficient quantization unit 206 may perform a scan of a matrix including quantized transform coefficients before the coefficients are output to entropy encoding unit 218. In other examples, entropy encoding unit 218 may perform a scan. Entropy encoding unit 218 may be configured to perform entropy encoding according to one or more of the techniques described herein. Entropy encoding unit 218 may be configured to output a compliant bitstream, i.e., a bitstream that a video decoder can receive and reproduce video data therefrom.

In this manner, video encoder 200 represents an example of a device configured to determine a predictive quantization parameter for a current video block based at least in part on a quantization parameter associated with a reference video block, a partitioning used to generate the reference video block, and a partitioning used to generate the current video block, and generate a quantization parameter for the current video block based at least in part on the determined predictive quantization parameter.

Figure 18:
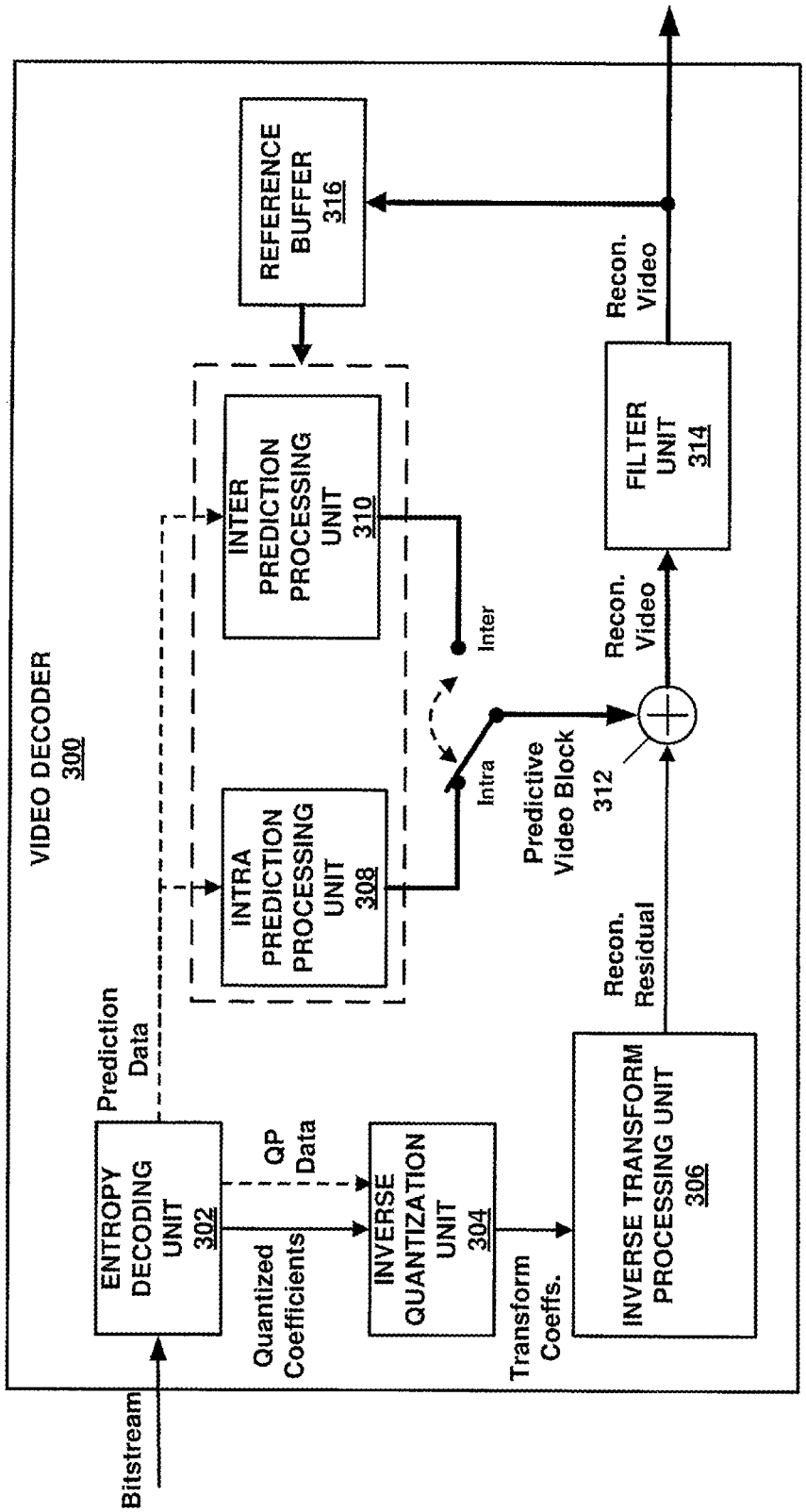
FIG. 18 is a block diagram illustrating an example of a video decoder that may be configured to decode video data according to one or more techniques of this disclosure.

FIG. 18 is a block diagram illustrating an example of a video decoder that may be configured to decode video data according to one or more techniques of this disclosure. In one example, video decoder 300 may be configured to reconstruct video data based on one or more of the techniques described above. That is, video decoder 300 may operate in a reciprocal manner to video encoder 200 described above. Video decoder 300 may be configured to perform intra prediction decoding and inter prediction decoding and, as such, may be referred to as a hybrid decoder. In the example illustrated in FIG. 18 video decoder 300 includes an entropy decoding unit 302, inverse quantization unit 304, inverse transformation processing unit 306, intra prediction processing unit 308, inter prediction processing unit 310, summer 312, filter unit 314, and reference buffer 316. Video decoder 300 may be configured to decode video data in a manner consistent with a video encoding system, which may implement one or more aspects of a video coding standard. It should be noted that although example video decoder 300 is illustrated as having distinct functional blocks, such an illustration is for descriptive purposes and does not limit video decoder 300 and/or sub-components thereof to a particular hardware or software architecture. Functions of video decoder 300 may be realized using any combination of hardware, firmware, and/or software implementations.

As illustrated in FIG. 18, entropy decoding unit 302 receives an entropy encoded bitstream. Entropy decoding unit 302 may be configured to decode quantized syntax elements and quantized coefficients from the bitstream according to a process reciprocal to an entropy encoding process. Entropy decoding unit 302 may be configured to perform entropy decoding according any of the entropy coding techniques described above. Entropy decoding unit 302 may parse an encoded bitstream in a manner consistent with a video coding standard. Video decoder 300 may be configured to parse an encoded bitstream where the encoded bitstream is generated based on the techniques described above. That is, for example, video decoder 300 may be configured to determine partitioning structures generated and/or signaled based on one or more of the techniques described above for purposes of reconstructing video data. For example, video decoder 300 may be configured to parse syntax elements and/or evaluate properties of video data in order to determine a partitioning.

Referring again to FIG. 18, inverse quantization unit 304 receives quantized transform coefficients (i.e., level values) and quantization parameter data from entropy decoding unit 302. Quantization parameter data may include any and all combinations of delta QP values and/or quantization group size values and the like described above. Video decoder 300 and/or inverse quantization unit 304 may be configured to determine QP values used for inverse quantization based on values signaled by a video encoder and/or through video properties and/or coding parameters. That is, inverse quantization unit 304 may operate in a reciprocal manner to coefficient quantization unit 206 described above. For example, inverse quantization unit 304 may be configured to infer predetermined values), allowed quantization group sizes, and the like, according to the techniques described above. Inverse quantization unit 304 may be configured to apply an inverse quantization. Inverse transform processing unit 306 may be configured to perform an inverse transformation to generate reconstructed residual data. The techniques respectively performed by inverse quantization unit 304 and inverse transform processing unit 306 may be similar to techniques performed by inverse quantization/transform processing unit 208 described above. Inverse transform processing unit 306 may be configured to apply an inverse DCT, an inverse DST, an inverse integer transform, Non-Separable Secondary Transform (NSST), or a conceptually similar inverse transform processes to the transform coefficients in order to produce residual blocks in the pixel domain. Further, as described above, whether a particular transform (or type of particular transform) is performed may be dependent on an intra prediction mode. As illustrated in FIG. 18, reconstructed residual data may be provided to summer 312. Summer 312 may add reconstructed residual data to a predictive video block and generate reconstructed video data. A predictive video block may be determined according to a predictive video technique (i.e., intra prediction and inter frame prediction). In one example, video decoder 300 and the filter unit 314 may be configured to determine QP values and use them for post filtering (e.g., deblocking). In one example, other functional blocks of the video decoder 300 which make use of QP may determine QP based on received signaling and use that for decoding.

Intra prediction processing unit 308 may be configured to receive intra prediction syntax elements and retrieve a predictive video block from reference buffer 316. Reference buffer 316 may include a memory device configured to store one or more frames of video data. Intra prediction syntax elements may identify an intra prediction mode, such as the intra prediction modes described above. In one example, intra prediction processing unit 308 may reconstruct a video block using according to one or more of the intra prediction coding techniques described herein. Inter prediction processing unit 310 may receive inter prediction syntax elements and generate motion vectors to identify a prediction block in one or more reference frames stored in reference buffer 316. Inter prediction processing unit 310 may produce motion compensated blocks, possibly performing interpolation based on interpolation filters. Identifiers for interpolation filters to be used for motion estimation with sub-pixel precision may be included in the syntax elements. Inter prediction processing unit 310 may use interpolation filters to calculate interpolated values for sub-integer pixels of a reference block. Filter unit 314 may be configured to perform filtering on reconstructed video data. For example, filter unit 314 may be configured to perform deblocking and/or SAO filtering, as described above with respect to filter unit 216. Further, it should be noted that in some examples, filter unit 314 may be configured to perform proprietary discretionary filter (e.g., visual enhancements). As illustrated in FIG. 18, a reconstructed video block may be output by video decoder 300. In this manner, video decoder 300 may be configured to generate reconstructed video data according to one or more of the techniques described herein. In this manner video decoder 300 represents an example of a device configured to determine a predictive quantization parameter for a current video block based at least in part on a quantization parameter associated with a reference video block, a partitioning used to generate the reference video block, and a partitioning used to generate the current video block, and generate a quantization parameter for the current video block based at least in part on the determined predictive quantization parameter.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

[0103] By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

CROSS REFERENCE

This Nonprovisional application claims priority under 35 U.S.C. § 119 on provisional Application No. 62/651,457 on Apr. 2, 2018, the entire contents of which are hereby incorporated by reference.

The invention claimed is:

1. A method of decoding a current video block in a video picture, the method comprising:
determining whether a partitioning scheme that is used to partition the current video block is a single tree partitioning that uses one partitioning for both luma and chroma color components of the current video block or a dual tree partitioning that uses two different partitionings for the luma color component of the current video block and the chroma color component of the current video block;
based on whether the determined partitioning scheme is single tree partitioning or dual tree partitioning, selecting one derivation to compute a first predictive quantization parameter for the current video block from a plurality of candidate derivations for computing the first predictive quantization parameter, wherein (i) a first derivation for computing the first predictive quantization parameter when the partitioning scheme is single tree partitioning comprises computing the first predictive quantization parameter based at least in part on another quantization parameter and an additional value and (ii) a second derivation for computing the first predictive quantization parameter when the partitioning scheme is dual tree partitioning comprises computing the first predictive quantization parameter by using a previously-derived quantization parameter;
computing a second quantization parameter for the current video block based at least in part on the computed first predictive quantization parameter and an offset value; and
using the computed second quantization parameter to decode the current video block.

2. The method of claim 1 further comprising performing a quantization operation on values associated with the current video block using the computed second quantization parameter.

3. The method of claim 1, wherein using the computed second quantization parameter comprises performing an inverse quantization operation on values associated with the current video block using the computed second quantization parameter.

4. The method of claim 1, wherein:
the first derivation is selected when the single tree partitioning scheme is identified as the partitioning scheme for the current video block and for a reference video block that is used for encoding the current video block; and the second derivation is selected when the dual tree partitioning scheme is identified for the current video block and a single tree partitioning scheme is identified for the reference video block.

5. The method of claim 4, wherein the reference video block is a neighboring coded video block.

6. The method of claim 5, wherein the neighboring coded video block is a video block to the left of the current video block in the current picture that includes the neighboring and current video blocks.

7. The method of claim 5, wherein the neighboring coded video block is a video block above the current video block in the current picture that includes the neighboring and current video blocks.

8. The method of claim 4, wherein the reference video block is a last coded video block in the current picture that includes the neighboring and current video blocks.

9. The method of claim 1, wherein the first derivation uses at least one equation not used by the second derivation.

10. The method of claim 1, wherein the computed first and second quantization parameters are first and second quantization parameters for the luma color component of the current video block.

11. The method of claim 1, wherein the computed first and second quantization parameters are first and second quantization parameters for the chroma color component of the current video block.

* * * * *